(12) United States Patent
Suzuki et al.

(10) Patent No.: US 8,532,711 B2
(45) Date of Patent: Sep. 10, 2013

(54) MOBILE TERMINAL DEVICE, AND PROGRAM USED IN MOBILE TERMINAL DEVICE

(75) Inventors: Toshiyuki Suzuki, Yokohama (JP); Toshihiro Azami, Yokosuka (JP); Hiroshi Inamura, Yokosuka (JP); Takeshi Tomimori, Itami (JP); Keisaku Fukuda, Fujisawa (JP); Takenori Kawamata, Fujisawa (JP)

(73) Assignee: NTT DoCoMo, Inc., Tokyo (JP)

( * ) Notice: Subject to any disclaimer, the term of this patent is extended or adjusted under 35 U.S.C. 154(b) by 906 days.

(21) Appl. No.: 11/521,536

(22) Filed: Sep. 15, 2006

(65) Prior Publication Data
US 2007/0063989 A1    Mar. 22, 2007

(30) Foreign Application Priority Data
Sep. 16, 2005    (JP) ................. P2005-270351

(51) Int. Cl.
*H04M 1/00*    (2006.01)
(52) U.S. Cl.
USPC ............... 455/566; 455/550.1; 455/575.1
(58) Field of Classification Search
USPC ............. 455/566, 550.1; 345/168, 169, 172, 345/173
See application file for complete search history.

(56) References Cited

U.S. PATENT DOCUMENTS

| | | | | |
|---|---|---|---|---|
| 5,311,175 | A * | 5/1994 | Waldman ..................... | 341/34 |
| 6,055,439 | A * | 4/2000 | Helin et al. ................. | 455/550.1 |
| 6,744,422 | B1 * | 6/2004 | Schillings et al. ............ | 345/169 |
| 7,107,079 | B2 * | 9/2006 | Shimabukuro ............... | 455/566 |
| 7,283,837 | B2 * | 10/2007 | Nagao ........................ | 455/550.1 |
| 2002/0057259 | A1 * | 5/2002 | Suzuki ........................ | 345/168 |
| 2004/0029611 | A1 * | 2/2004 | Nagao ........................ | 455/550.1 |
| 2006/0105753 | A1 * | 5/2006 | Bocking et al. ............... | 455/417 |

FOREIGN PATENT DOCUMENTS

| | | |
|---|---|---|
| CN | 1353528 A | 6/2002 |
| EP | 0 469 546 A2 | 2/1992 |
| EP | 1 309 158 A2 | 5/2003 |
| GB | 2 401 701 A | 11/2004 |
| JP | 2000-278374 | 10/2000 |
| JP | 2003-271295 | 9/2003 |
| JP | 2004-534425 | 11/2004 |
| WO | WO 92/08285 | 5/1992 |

OTHER PUBLICATIONS

U.S. Appl. No. 11/521,299, filed Sep. 15, 2006, Suzuki, et al.

* cited by examiner

*Primary Examiner* — Ajit Patel
*Assistant Examiner* — Julio Perez
(74) *Attorney, Agent, or Firm* — Oblon, Spivak, McClelland, Maier & Neustadt, L.L.P.

(57) ABSTRACT

A mobile terminal device, which is provided with the plurality of keys, includes: a touch detection interface for detecting that a user has touched a key; a press detection interface for detecting that the user has pressed the key; a controller for switching the mode in response to whether or not the user has touched a side key, in order to execute a first function assigned to the key in a case where the key is pressed by the user in a "shift mode," and to execute a second function assigned to the key in a case where the key is pressed by the user in a "normal mode"; and a display unit for displaying an explanation on the first function assigned to the key in a case where it is detected in the "shift mode" that the user has touched the key.

10 Claims, 21 Drawing Sheets

| KEY TYPE | FIRST FUNCTION | SECOND FUNCTION |
|---|---|---|
| S/W (1) | MAIL | MENU |
| ENTER | TELEPHONE DIRECTORY | TELEPHONE DIRECTORY |
| S/W (2) | INTERNET | JUMP |

TOUCH "SIDE KEY" AND "S/W (1) KEY"

TOUCH "SIDE KEY"

SHIFT MODE IS CONTINUED

FIG. 11

| KEY TYPE | FIRST FUNCTION | SECOND FUNCTION (NUMBER INPUT) |
|---|---|---|
| 1 | CUSTOMIZE | 1 |
| 2 | CAMERA | 2 |
| 3 | MEMORY STICK | 3 |
| 4 | SETTINGS | 4 |
| 5 | DATA BOX | 5 |
| 6 | USEFUL FUNCTIONS | 6 |
| 7 | MAIL | 7 |
| 8 | INTERNET | 8 |
| 9 | APPLICATION | 9 |
| * | NOT ASSIGNED | * |
| 0 | NOT ASSIGNED | 0 |
| # | NOT ASSIGNED | # |

TOUCH "SIDE KEY"

TOUCH "SIDE KEY" AND "1" KEY

TOUCH "CALL KEY"

SLIDE FINGER FROM "CALL KEY" TO "1" KEY

TOUCH "SIDE KEY"

TOUCH "1" KEY

SLIDE FINGER TO "5" KEY

PRESS "5" KEY

MOBILE TERMINAL DEVICE, AND PROGRAM USED IN MOBILE TERMINAL DEVICE

CROSS REFERENCE TO RELATED APPLICATION

This application is based upon and claims the benefit of priority from the prior Japanese Patent Application No. P2005-270351, filed on Sep. 16, 2005; the entire contents of which are incorporated herein by reference.

BACKGROUND OF THE INVENTION

1. Field of the Invention

The present invention relates to a mobile terminal device provided with a plurality of keys to each of which a plurality of functions are assigned, and to a program used in this mobile terminal device.

2. Description of the Related Art

As a mobile terminal device such as a mobile telephone or a personal digital assistant (PDA), a mobile terminal device, which is provided with function keys for calling functions installed therein, has heretofore been widely known. Moreover, a mobile terminal device, in which a plurality of functions is assigned to a single function key, has also been known. This is because it is preferable that a mobile terminal device not be provided with a large number of function keys when portability of the mobile terminal device is focused.

For example, in such a mobile terminal device, a plurality of functions assigned to a single key is switched by switching such modes as a "normal mode," a "speed dialing mode." Specifically, if a key is pressed in a case where the currently selected mode is the "normal mode," one of the functions assigned to this key (function to input numbers) is executed. If the key is pressed when the mode is the "speed dialing mode," another function assigned to the key (function to place a call by speed dialing) is executed (see Japanese Patent Application Laid-open No. 2000-278374, for example).

Generally, in order to switch modes of the mobile terminal device described above, a mode switch screen for switching modes has to be called. However, the process of switching the modes is complicated.

Moreover, it is also conceivable that the mobile terminal device be provided with a mode switch key for switching modes. However, when modes are switched frequently, the mode switch key has to be pressed repeatedly, and the complicated process of switching modes is not simplified enough.

SUMMARY OF THE INVENTION

The present invention has been made to solve the foregoing problem. It is an object of the present invention to provide a mobile terminal device capable of simplifying the complicated process of switching modes and a program used in this mobile terminal device.

A first aspect of the present invention provides a mobile terminal device, which has a plurality of keys, and which includes: a touch detector (a touch pad 10b and a press detection interface 12) configured to detect touching any of the keys by a user; a press detector (a press detection interface 12) configured to detect pressing any of the keys by the user; a mode switcher (a controller 14) configured to switch a mode to a first mode in a case where the user touches a certain key, which is one of the keys, and to switch the mode to a second mode in a case where the user does not touch the certain key; a function executor (a controller 14) configured to execute a first function assigned to an input key, which is a key different from the certain key, in a case where the press detector detects in the first mode that the user has pressed the input key, and to execute a second function assigned to the input key in a case where the press detector detects in the second mode that the user has pressed the input key; and an output unit (a display unit 20) configured to output an explanation on the first function assigned to the input key in a case where the touch detector detects in the first mode that the user has touched the input key.

According to this aspect, the mode switcher switches modes in response to whether or not the user has touched the certain key. Thereby, even in a case where the user switches the modes frequently, the user can switch the modes easily Without calling the mode switch screen or without pressing the mode switch key repeatedly. That is, the mobile terminal device can simplify the complicated process of switching modes.

A second aspect of the present invention provides the mobile terminal device according to the first aspect, wherein, the output unit outputs an explanation on the second function assigned to the input key in a case where the touch detector detects in the second mode that the user has touched the input key.

A Third aspect of the present invention provides the mobile terminal device according to the first aspect, wherein, even if the detected status has been changed from the touching the certain key by the user to the not touching the certain key, the mode switcher keeps the first mode for ascertain time period without switching the mode from the first mode to the second mode.

A Fourth aspect of the present invention provides the mobile terminal device according to the first aspect, wherein, in a case where the detected state has been changed from touching the certain key by the user to touching the input key by the user sequentially, the mode switcher keeps the first mode without switching the mode from the first mode to the second mode until when the user does not touch any one of the input keys, even if the user has not touched the certain key.

A sixth aspect of the present invention provides a program used in a mobile terminal device having the plurality of keys, the program causing the mobile terminal device to execute the steps of: detecting touching any of the keys by a user; detecting pressing any of the keys by the user; switching a mode to a first mode in a case where the user touches a certain key, which is one of the keys, and switching the mode to a second mode in a case where the user does not touch the certain key; executing a first function assigned to an input key, which is a key different from the certain key, in a case where it is detected in the first mode that the user has pressed the input key, and executing a second function assigned to the input key in a case where it is detected in the second mode that the user has pressed the input key; and outputting an explanation on the first function assigned to the input key in a case where it is detected in the first mode that the user has touched the input key.

According to the present invention, a mobile terminal device capable of simplifying the complicated process of switching the modes, and a program used in this mobile terminal device can be provided.

BRIEF DESCRIPTION OF THE DRAWINGS

FIG. 11 is a table showing key assignment information according to a third embodiment of the present invention.

DETAILED DESCRIPTION OF THE PREFERRED EMBODIMENTS

Figure 1:
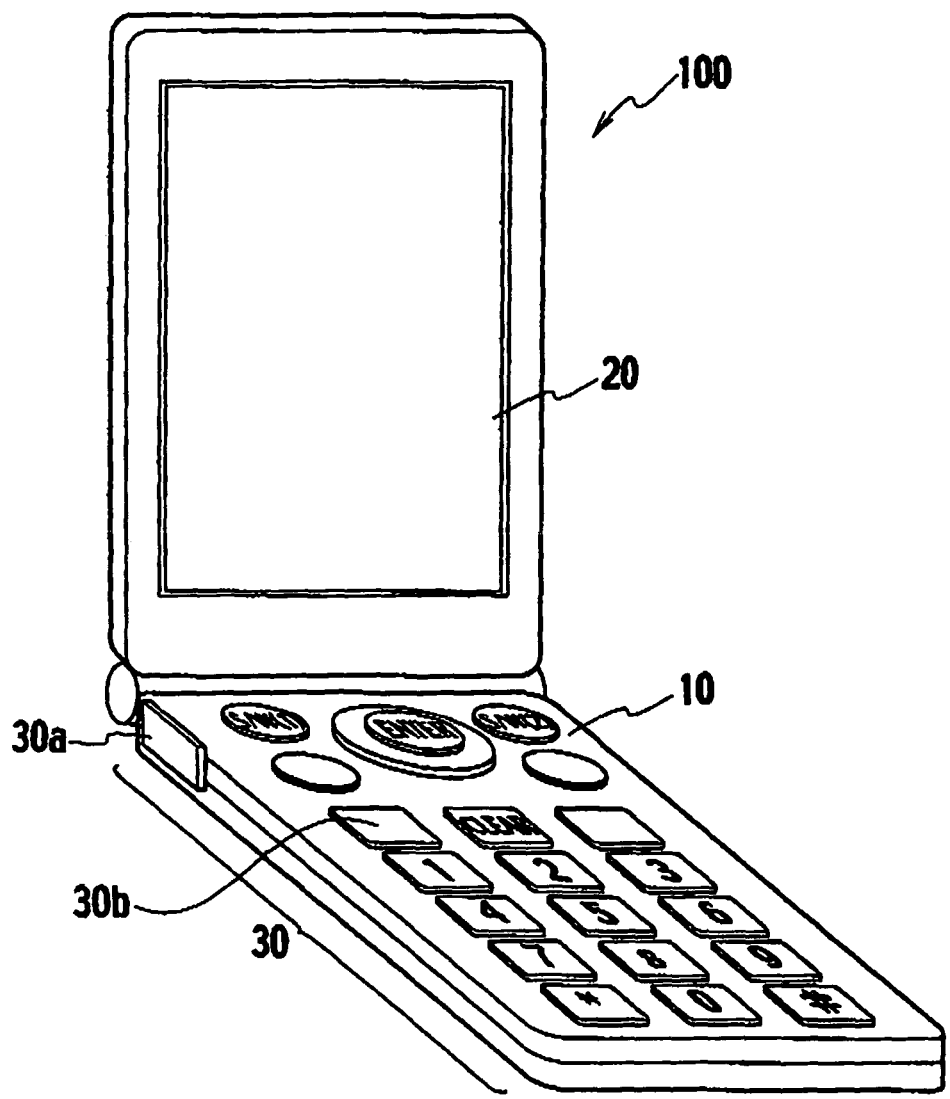
FIG. 1 is an external view showing a mobile terminal device 100 according to a first embodiment of the present invention.

Hereinafter, mobile terminal devices according to embodiments of the present invention will be described with reference to the accompanying drawings. In the description of the drawings, identical or similar constituents are designated by identical or similar reference numerals. It is to be noted, however, that the drawings are schematic, and that proportions of the respective dimensions and other factors may be different from actual features.

First Embodiment

Configuration Of Mobile Terminal Device

Descriptions will be provided below for a configuration of a mobile terminal device according to a first embodiment of the present invention with reference to the accompanying drawings. FIG. 1 is an external view showing a mobile terminal device 100 according to the first embodiment of the present invention.

As shown in FIG. 1, the mobile terminal device 100 includes a main unit 10 and a display unit 20. The main unit 10 has a plurality of keys 30. In this event, the keys 30 refer to keys such as "0" to "9", "*","#" and "clear", and software keys. Moreover, the main unit 10 is provided with a side key 30a for switching modes, each of the modes being set for each function assigned to each key 30, and a call key 30b for calling, and the like. The mode concerning the first embodiment is switched to a "normal mode" in a case where a user does not touch the side key 30a. Further, the mode is switched to a "shift mode" in a case where the user touches the side key 30a.

The main unit 10 includes a control board 10c to be described later, and executes functions assigned to the keys 30 which are pressed. Incidentally, the functions include a function to input characters, a function for speed dialing, a function to call various screens, a function to start various applications, and a function to output various contents.

The explanations and the like on the respective functions are displayed on the display unit 20. In addition, any of the various screens called by the function, any of the various applications activated by the function, or the like, is displayed on the display unit 20.

Figure 2:
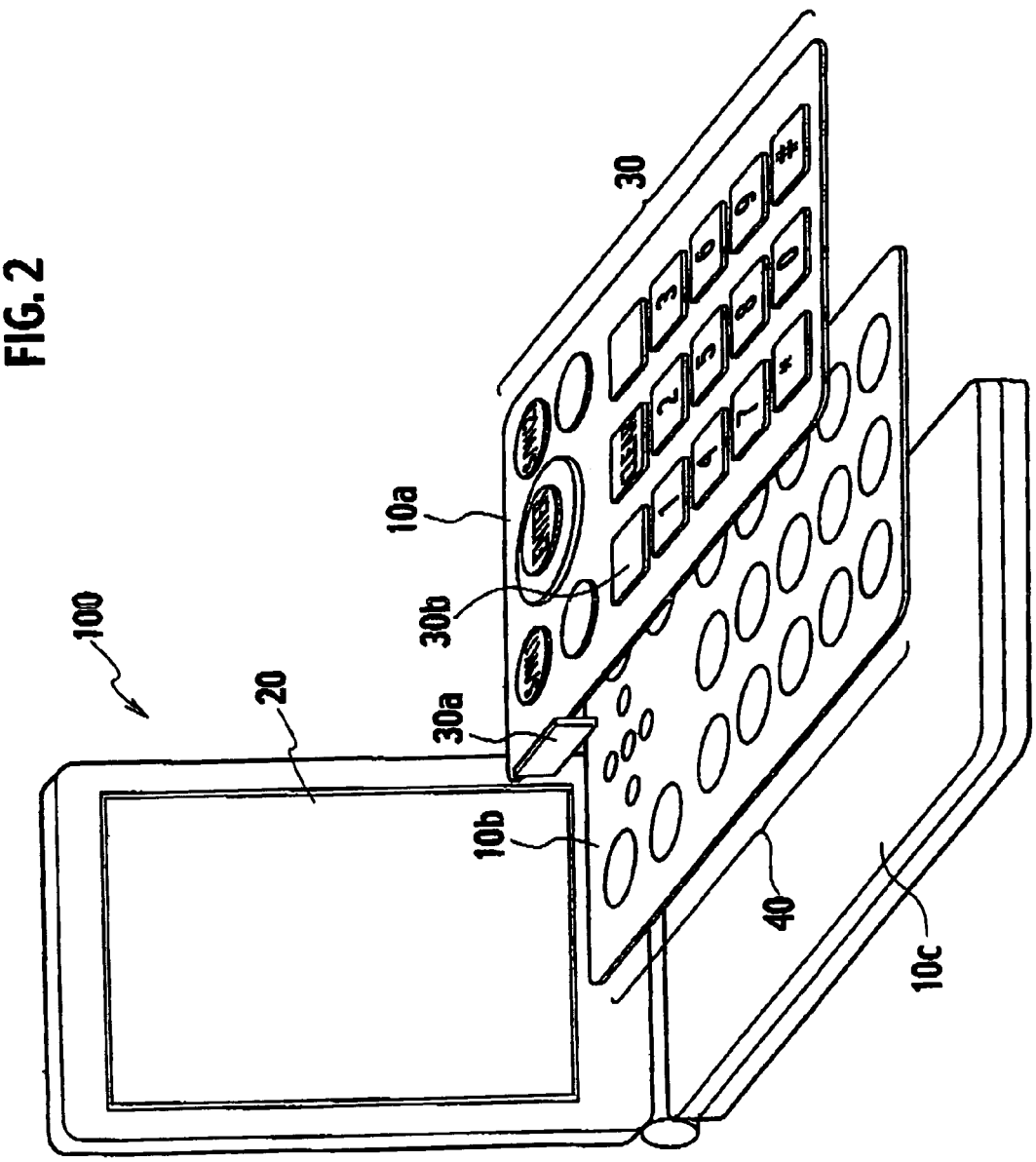
FIG. 2 is an exploded view showing the mobile terminal device 100 according to the first embodiment of the present invention.

FIG. 2 is an exploded view showing the mobile terminal device 100 according to the first embodiment of the present invention. As shown in FIG. 2, the main unit 10 includes a key-arranged surface 10a, a touch pad 10b, and the control board 10c.

The key-arranged surface 10a is a sheet member for holding the keys 30, and includes a plurality of holes (not shown) in which the keys 30 fit.

The touch pad 10b detects touches on the respective keys 30 by a user. Incidentally, the touch pad 10b can also detect a continuous touch on any of the keys 30 by the user.

The control board 10c controls the mobile terminal device 100 in response to detection by the touch pad 10b. Details of the control board 10c will be described later (see FIG. 3).

(Configuration Of Control Board)

Figures 3, 4:
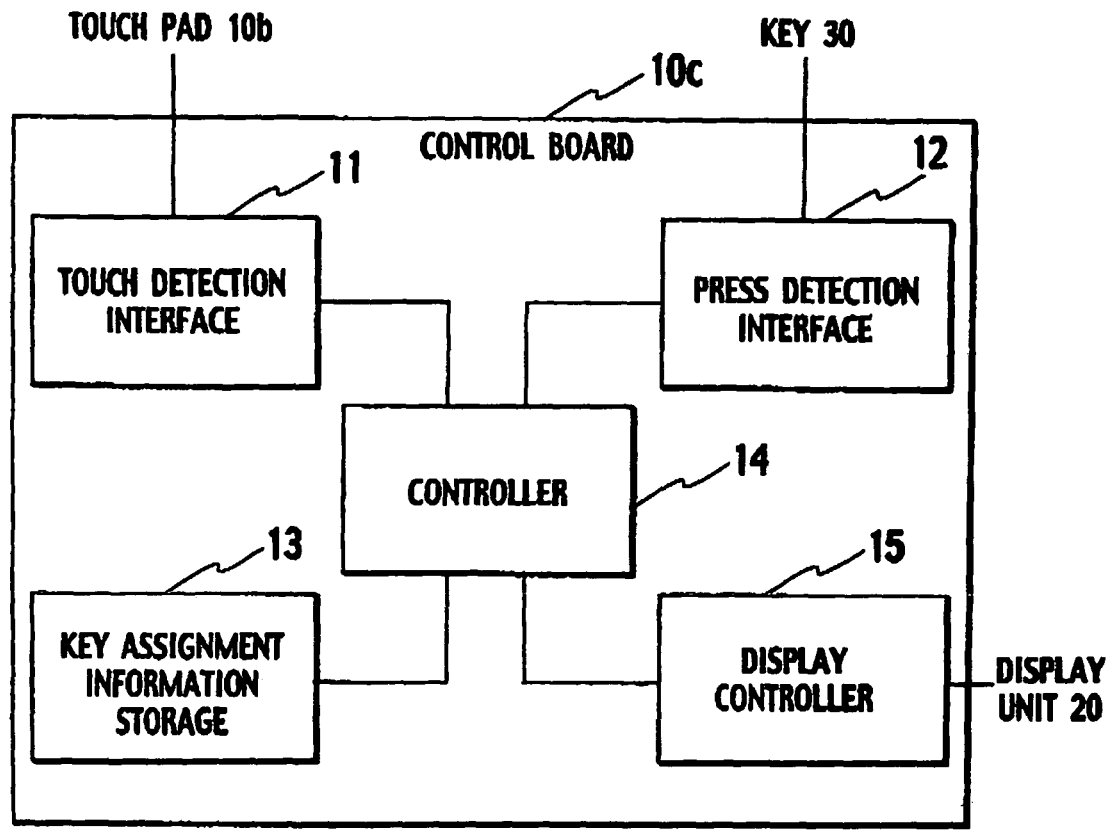
FIG. 3 is a block diagram showing a control board 10c according to the first embodiment of the present invention.
FIG. 4 is a table showing key assignment information according to the first embodiment of the present invention.

A configuration of the above-mentioned control board 10c will be described below with reference to the accompanying drawing. FIG. 3 is a block diagram showing the control board 10c according to the first embodiment of the present invention.

As shown in FIG. 3, the control board 10c includes a touch detection interface 11, a press detection interface 12, a key assignment information storage 13, a controller 14, and a display controller 15.

The touch detection interface 11 is connected to the touch pad 10b, and is configured to obtain, from the touch pad 10b, a signal indicating that the user has touched one of the respective keys 30. Note that the touch detection interface 11 obtains the signal continuously from the touch pad 10b in a case where the user continues to touch any of the keys 30.

The press detection interface 12 is connected to each of the keys 30, and is configured to obtain a signal indicating that the user has pressed each of the keys 30.

The key assignment information storage 13 stores information, as key assignment information, which respectively associates the type of the keys 30 with functions assigned to the respective keys 30. In addition, plurality of functions is assigned to each of the keys 30. Details of the key assignment information will be described later (see FIG. 4).

The controller 14 switches the modes in response to whether or not a user touches the side key 30a described above. Specifically, the controller 14 sets the "normal mode" in a case where the user does not touch the side key 30a, and sets the "shift mode" in a case where the user touches the side key 30a.

Moreover, the controller 14 executes the function assigned to each of the keys 30 in response to the type of the mode and the type of the key 30 which a user has pressed. Specifically, in a case where the mode is the "shift mode," the controller 14 executes the function (a first function to be described later) assigned to the key 30 which the user has pressed. On the other hand, in a case where the mode is the "normal mode," the controller 14 executes the function (a second function to be described later) assigned to the key 30 which the user has pressed.

Moreover, the controller 14 instructs the display controller 15 to display an explanation on the function assigned to the key 30, in response to the type of the mode and the type of the key 30 which a user has touched. To be more precise, in a case where the mode is the "shift mode," the controller 14 instructs the display controller 15 to display an explanation on the function (a first function to be described later) assigned to the key 30 which the user has touched. On the other hand, in a case where the mode is the "normal mode," the controller 14 instructs the display controller 15 to display the explanation on the function (a second function to be described later) assigned to the key 30 which the user has touched.

The display controller 15 displays, on the display unit 20, the explanation on the function assigned to the key 30 in response to the instruction by the controller 14. Incidentally, the explanation on the function may be a character string, an icon for indicating the type of the function, or the like.
(Key Assignment Information)

The above-mentioned key assignment information will be described below with reference to the accompanying drawing. FIG. 4 is a table showing the key assignment information according to the first embodiment of the present invention.

As shown in FIG. 4, the key assignment information is information for associating the type of the keys 30 with the functions assigned to the respective keys 30. Moreover, the first function executed in a case where the mode is the "shift modes" and the second function executed in a case where the mode is the "normal mode" are assigned to the respective keys 30.

For example, to a "S/W (1)" key, the function to call a mail editing screen is assigned as the first function and the function to call a menu screen is assigned as the second function.
(Operations Of Mobile Terminal Device)

Figure 5:
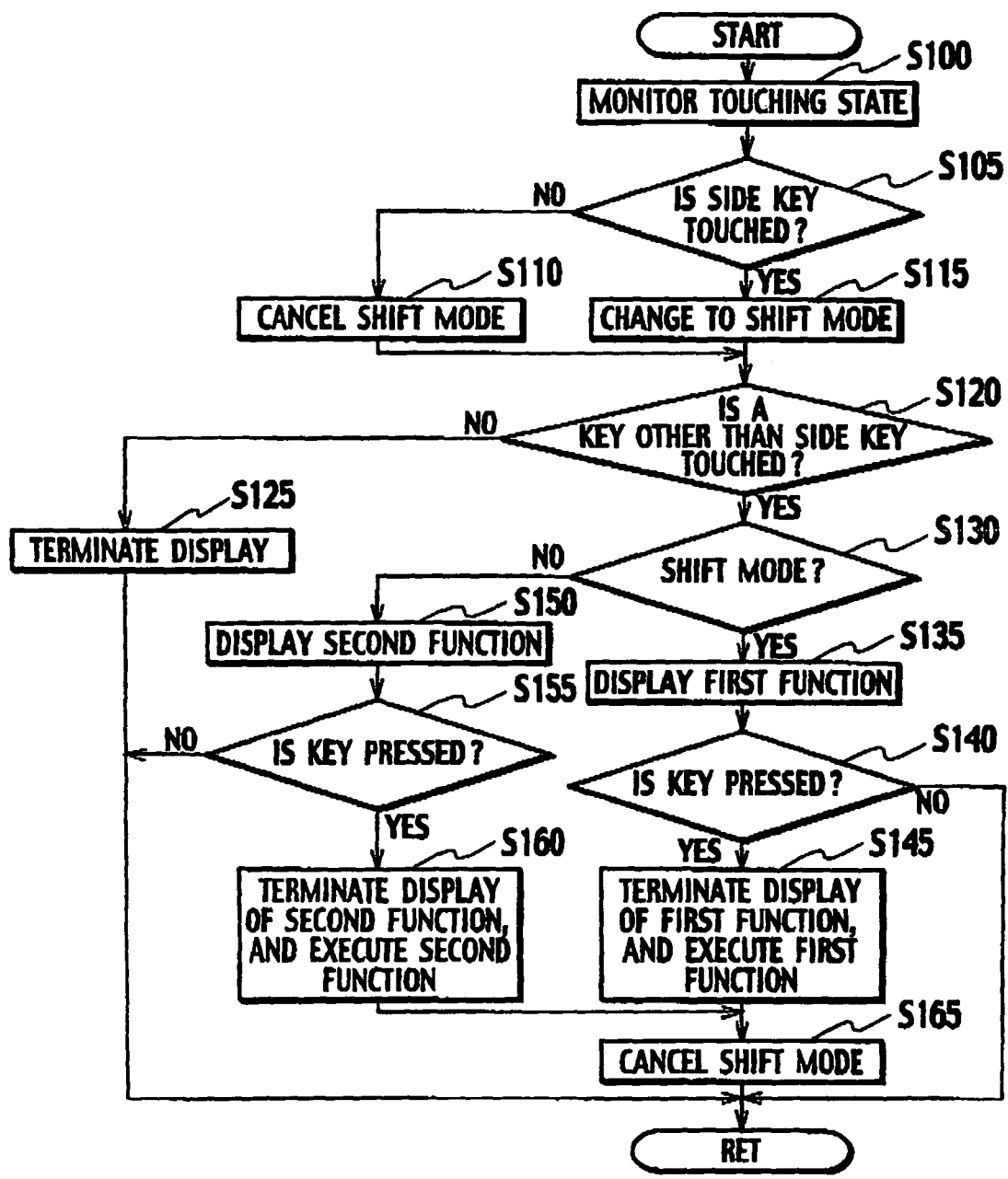
FIG. 5 is a flowchart showing operations of the mobile terminal device 100 according to the first embodiment of the present invention.

Operations of the above-mentioned mobile terminal device 100 will be described below with reference to the accompanying drawing. FIG. 5 is a flowchart showing the operations of the mobile terminal device 100 according to the first embodiment of the present invention.

As shown in FIG. 5, in Step S100, the mobile terminal device 100 monitors a state of touching the keys 30 by a user.

In Step S105, the mobile terminal device 100 judges whether or not a user touches the side key 30a. Moreover, the mobile terminal device 100 proceeds to the processing in Step S115 in a case where the user has touched the side key 30a, or proceeds to the processing in Step S110 in a case where the user has not touched the side key 30a.

In Step S110, in a case where the mode is the "shift mode," the mobile terminal device 100 cancels the "shift mode" and sets the "normal mode."

In Step S115, the mobile terminal device 100 sets the "shift mode." That is, in a case where the mode has been the "normal mode," the mobile terminal device 100 changes the mode to the "shift mode."

In Step S120, the mobile terminal device 100 judges whether or not the user has touched the key 30 (an input key) other than the side key 30a. Moreover, the mobile terminal device 100 proceeds to the processing in Step S130 in a case where the user has touched the key 30 other than the side key 30a, or proceeds to the processing in Step S125 in a case where the user has not touched the key 30 other than the side key 30a.

In Step S125, the mobile terminal device 100 terminates a display of an explanation either on the first function or on the second function in a case where the explanation on the first function or on the second function has been currently displayed.

In Step S130, the mobile terminal device 100 judges whether or not the mode is the "shift mode." Moreover, the mobile terminal device 100 proceeds to the processing in Step S135 in a case where the mode is the "shift mode" or proceeds to the processing in Step S150 in a case where the mode is the "normal mode."

In Step S135, the mobile terminal device 100 displays on the display unit 20 an explanation on the first function assigned to the key 30 which the user has touched. For example, in a case where the mode is the "shift mode" and the user has touched the "S/W (1)" key, the mobile terminal device 100 displays on the display unit 20 an explanation on the first function assigned to the "S/W (1)" key, i.e., the function to call a mail editing screen for editing the mails (for example, character strings, icons, and the like of the "mail").

In Step S140, the mobile terminal device 100 judges whether or not the user has pressed the key 30. Moreover, the mobile terminal device 100 proceeds to the processing in Step S145 in a case where the user has pressed the key 30, or returns to the processing in Step S100 in a case where the user has not pressed the key 30.

In Step S145, the mobile terminal device 100 terminates a display of an explanation on the first function and executes the first function assigned to the key 30 which the user has pressed. For example, in a case where the mode is the "shift mode" and the user has pressed the "S/W (1)" key, the mobile terminal device 100 executes the first function assigned to the "S/W (1)" key, i.e., the function to call the mail editing screen.

In Step S150, the mobile terminal device 100 displays on the display unit 20 an explanation on the second function assigned to the key 30 which the user has touched. For example, in a case where the mode is the "normal mode" and the user has touched the "S/W (1)" key, the mobile terminal device 100 displays on the display unit 20 an explanation on the second function assigned to the "S/W (1)" key, i.e., the function to call the menu screen (for example, character strings, icons, and the like of the "menu").

In Step S155, the mobile terminal device 100 judges whether or not the user has pressed the key 30. Moreover, the mobile terminal device 100 proceeds to the processing in Step S160 in a case where the user has pressed the key 30, or returns to the processing in Step S100 in a case where the user has not pressed the key 30.

In Step S160, the mobile terminal device 100 terminates a display of an explanation on the second function and executes the second function assigned to the key 30 which the user has pressed. For example, in a case where the mode is the "normal mode" and the user has pressed the "S/W (1)" key, the mobile terminal device 100 executes the second function assigned to the "S/W (1)" key, i.e., the function to call the menu screen.

In Step S165, the mobile terminal device 100 cancels the "shift mode" and sets the "normal mode."

(Display Screen)

Figure 6:
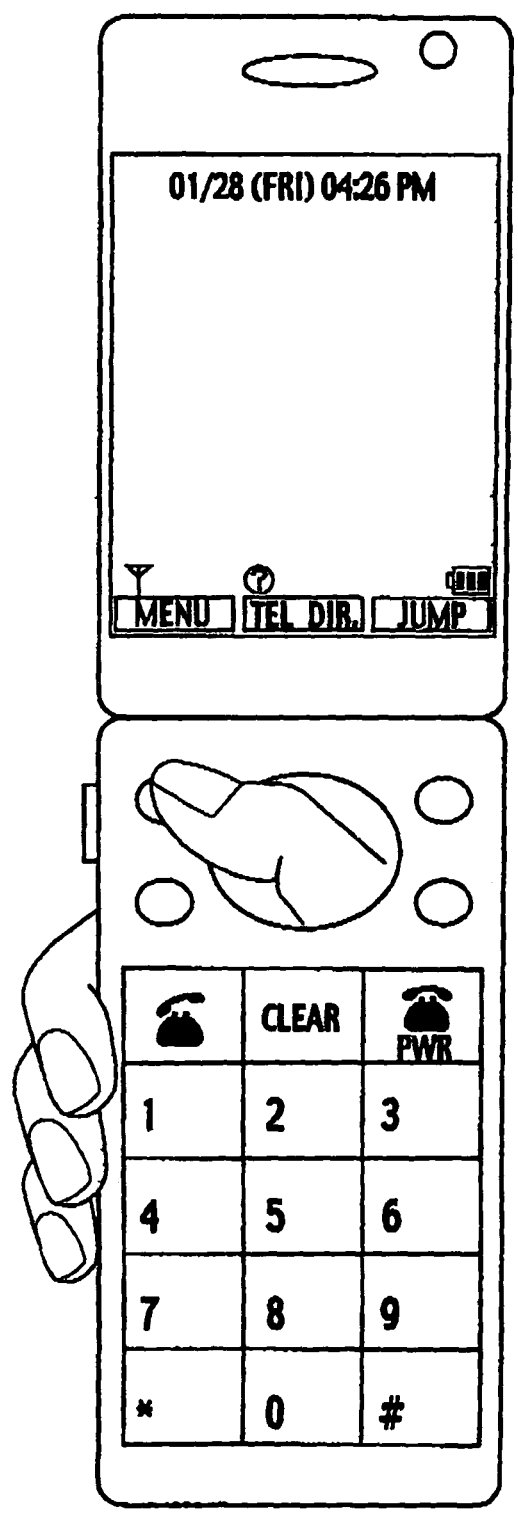
FIG. 6 is a view (part 1) showing a screen to be displayed on a display unit 20 according to the first embodiment of the present invention.
Figure 7:
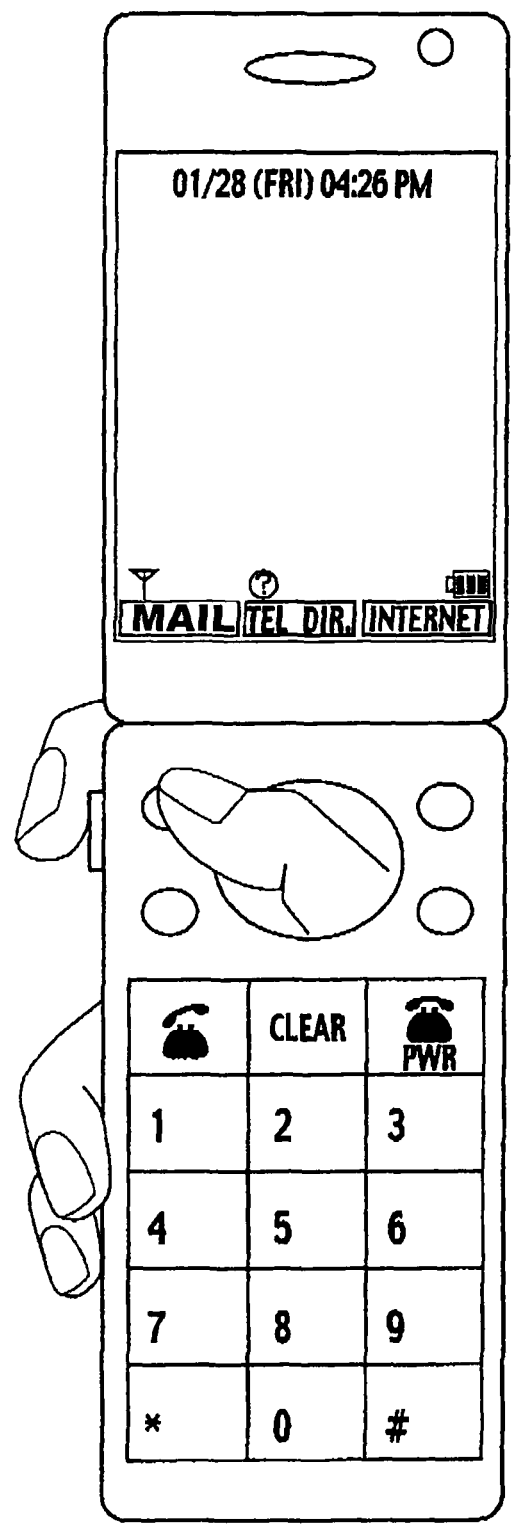
FIG. 7 is a view (part 2) showing the screen to be displayed on the display unit 20 according to the first embodiment of the present invention.

The screen to be displayed on the display unit 20 described above will be described with reference to the accompanying drawings. FIGS. 6 and 7 are views respectively showing screens to be displayed on the display unit 20 according to the first embodiment of the present invention.

FIG. 6 is a view showing a screen to be displayed on the display unit 20 in a case where a user has not touched the side key 30a but has touched the "S/W (1)" key. As shown in FIG. 6, on the display unit 20, an explanation on the second function assigned to the "S/W (1)" key, i.e., an explanation on the function to call the menu screen, (character strings of a "menu") is displayed. Moreover, on the display unit 20, there are displayed an explanation on the second functions assigned to an "enter" key and a "S/W (2)" key, i.e., an explanation on the function to call a telephone directory (a character string of "telephone directory"), and an explanation of the function to call a jump screen on which shortcut functions are listed (a character string of "jump"), the shortcut functions being set by the user.

FIG. 7 is a view showing a screen to be displayed on the display unit 20 in a case where the user has touched the side key 30a and the user has also touched the "S/W (1)" key. As shown in FIG. 7, on the display unit 20, an explanation on the first function assigned to the "S/W (1)" key, i.e., an explanation on the function to call the mail editing screen, (a character string of "mail") is displayed. Moreover, on the display unit 20, an explanation on the first functions assigned to the "enter" key and the "S/w (2)" key, i.e., an explanation on the function to call the telephone directory, (a character string of "telephone directory") and an explanation on the function to call a screen for using the Internet (a character string of "Internet") are also displayed.

(Action And Effect)

According to the mobile terminal device 100 of the first embodiment, the mobile terminal device 100 switches the modes in response to whether or not the user has touched the side key 30a, thereby allowing the user to switch the modes easily without calling the mode switch screen or without pressing the mode switch key repeatedly even in the case where the modes are switched frequently. That is, the mobile terminal device 100 can simplify the complicated process of switching the modes.

Moreover, in a case where the mode is the "shift mode," the display controller 15 displays on the display unit 20 the explanation on the first function assigned to the key 30, thereby enabling the user to grasp easily the function which is to be executed in a case where the key 30 is pressed.

Second Embodiment

A mobile terminal device according to a second embodiment of the present invention will be described below with reference to the accompanying drawings. Hereinafter, differences from the above-mentioned first embodiment will be mainly described.

Specifically, in the above-described first embodiment, the "shift mode" is set only when the user has touched side key 30a. In the first embodiment, the "shift mode" is cancelled and then the "normal mode" is set when the user has not touched the side key 30a.

On the other hand, in the second embodiment, even in a case where the state has been changed from the touching the side key 30a by the user to not touching the side key 30a, the "shift mode" will continue for a certain time period without being cancelled.

(Operation Of Mobile Terminal Device)

Figure 8:
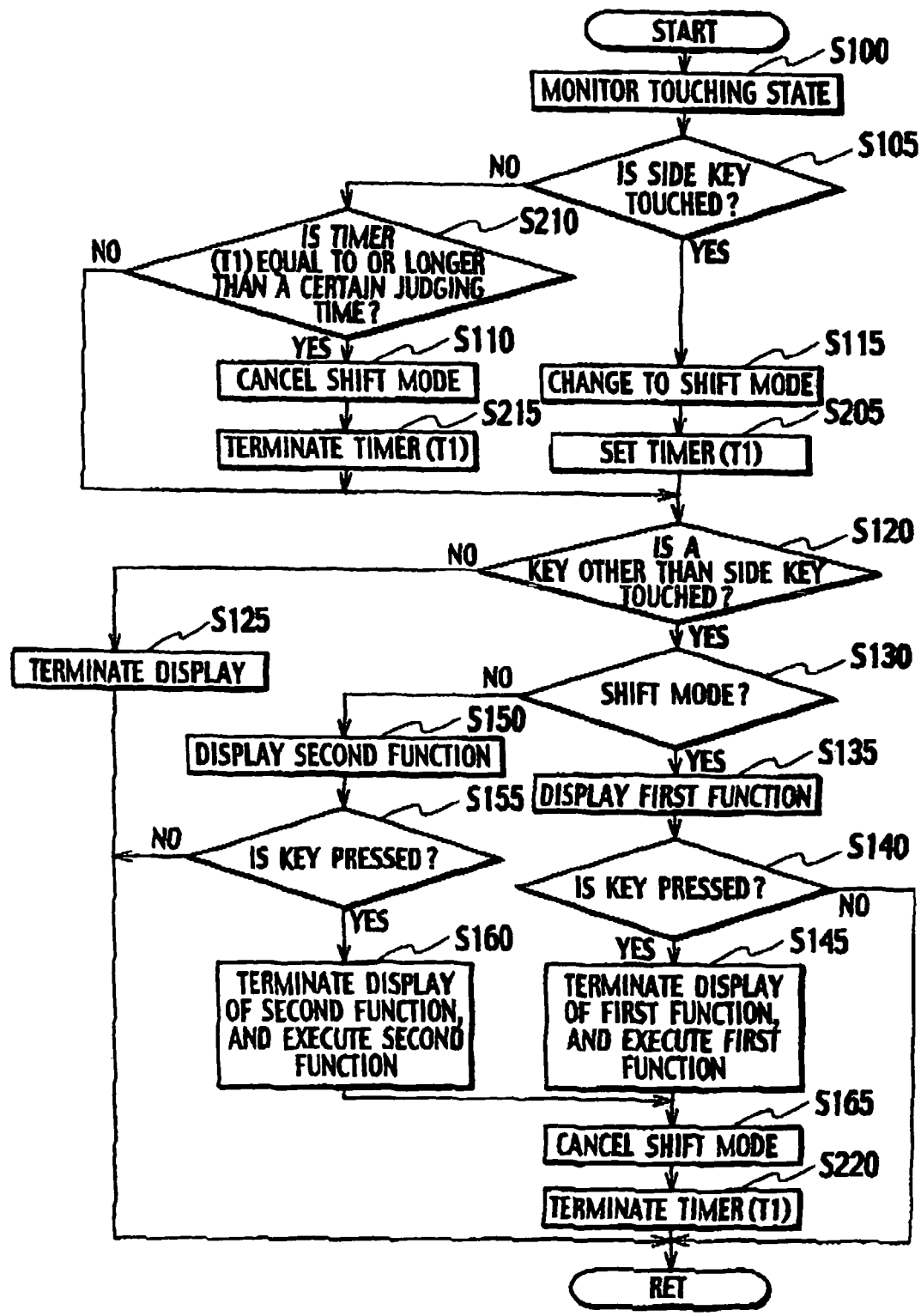
FIG. 8 is a flowchart showing operations of the mobile terminal device 100 according to a second embodiment of the present invention.

Descriptions will be provided below for operations of the mobile terminal device 100 according to the second embodiment of the present invention with reference to the accompanying drawing. FIG. 8 is a flowchart showing the operations of the mobile terminal device 100 according to the second embodiment of the present invention. In FIG. 8, the processes identical to those shown in the flowchart of FIG. 5 are designated by the same step numbers.

As shown in FIG. 8, in Step S205, in the mobile terminal device 100, a timer (T1) is set to "0" to start the count-up of the duration time period of the shift mode. Incidentally, the process in Step S205 is a process executed in a case where it is judged in Step S105 that the user has touched the side key 30a.

In Step S210, the mobile terminal device 100 judges whether or not the duration time period of the shift mode has exceeded a certain judging time based on the duration time period being counted up by the timer (T1). Moreover, the mobile terminal device 100 proceeds to the processing in Step S110 in a case where the duration time period of the shift mode equals to, or longer than, the certain judging time, or proceeds to the processing in Step S120 in a case where the duration time period of the shift mode is shorter than the certain judging time. Incidentally, the process in Step S210 is a process executed in a case where it is judged in Step S105 that the user has not touched the side key 30a.

In Step S215, the mobile terminal device 100 terminates the count-up of the duration time period of the shift mode by the timer (T1). Incidentally, the process in Step S215 is a process executed in a case where it is judged at the process in Step S210 that the duration time period of the shift mode equals to, or longer than, the certain judging time.

In Step S220, the mobile terminal device 100 terminates the count-up of the duration time period of the shift mode by the timer (T1). Incidentally, the process in Step S220 is a process executed in a case where the first function or the second function assigned to the key 30 which the user has pressed is executed.

Incidentally, although in the second embodiment the count-up of the duration time period of the shift mode by the timer (T1) starts at the time when the user touched the side key 30a, but not restricted thereto. For example, the count-up of the duration time period of the shift mode by the timer (T1) may start at the time when the user moves his/her finger off the side key 30a.

(Display Screen)

Figure 9:
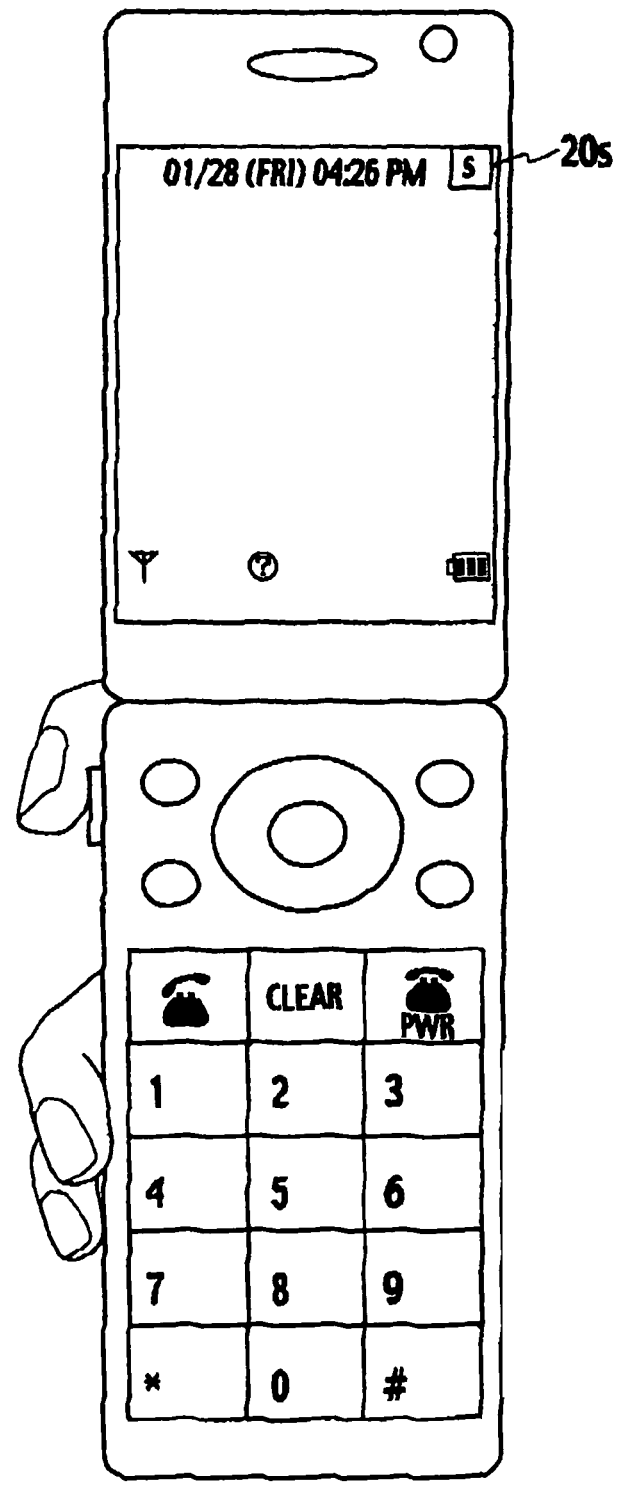
FIG. 9 is a view (part 1) showing a screen to be displayed on a display unit 20 according to the second embodiment of the present invention.

Descriptions will be provided below for a screen to be displayed on the display unit 20 according to the second embodiment of the present invention with reference to the accompanying drawing. FIG. 9 is a view showing a screen to be displayed on the display unit 20 according to the second embodiment of the present invention.

To be more precise, FIG. 9 is the view showing the screen to be displayed on the display unit 20 in a case where the user has touched the side key 30a. As shown in FIG. 9, on the display unit 20, a shift indication 20s indicating that the mode is the "shift mode" is displayed.

Figure 10:
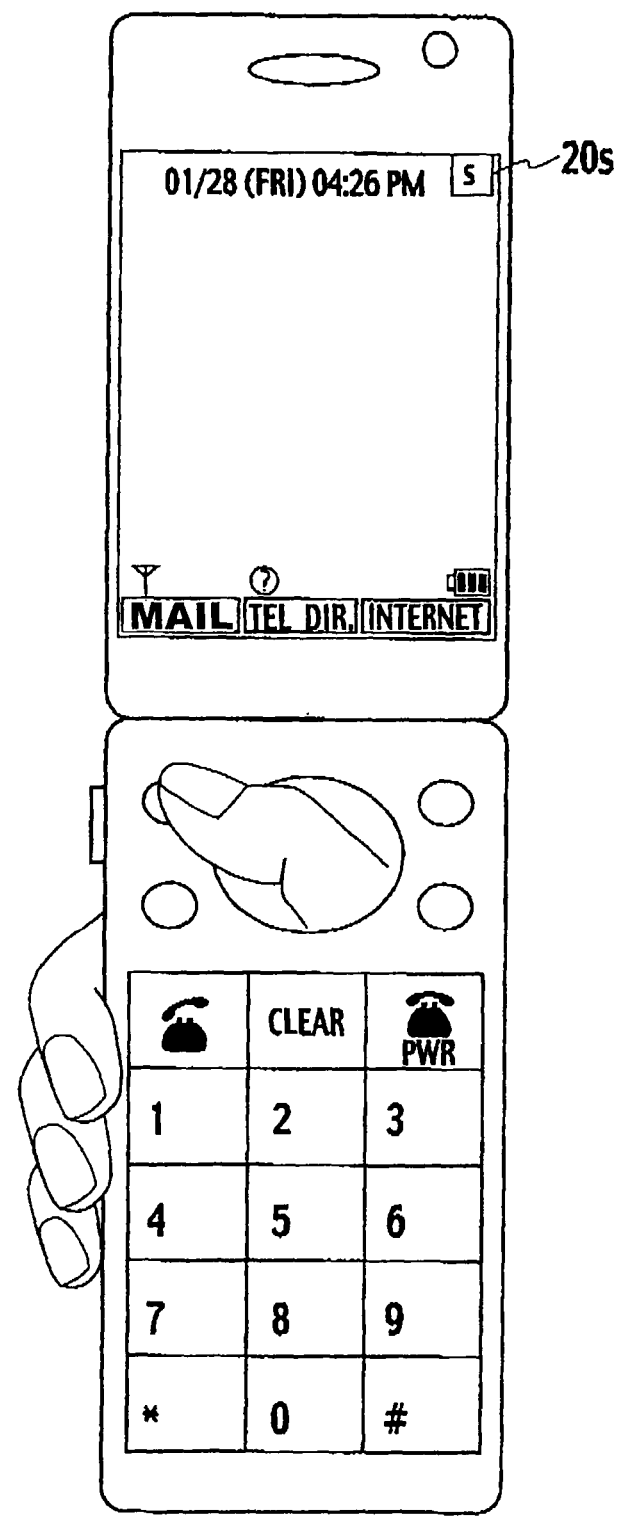
FIG. 10 is a view (part 2) showing a screen to be displayed on a display unit 20 according to the second embodiment of the present invention.

FIG. 10 is the view showing the screen to be displayed on the display unit 20 after the state shown in FIG. 9, and when a user touches the "S/W (1)" key after moving his/her finger off the side key 30a. As shown in FIG. 10, on the display unit 20, together with the shift indication 20s described above, an explanation on the first function assigned to the "S/W (1)" key, i.e., an explanation on the function to call the mail editing screen (a character string of "mail") is displayed. Moreover, on the display unit 20, an explanation on the first functions assigned to the "enter" key and the "S/W (2)" key, i.e., an explanation on the function to call the telephone directory, (a character string of "telephone directory") and an explanation on the function to call a screen for using the Internet (a character string of "Internet") are displayed.

(Action And Effect)

According to the mobile terminal device 100 of the second embodiment, when the detected state has been changed from the touching the side key 30a by the user to not touching the side key 30a, the "shift mode" will continue for a certain time period.

Hence, even in a case where the user moves his/her finger off the side key 30a unintentionally, for example the user re-grasps the mobile terminal device 100, the mobile terminal device 100 keeps the "shift mode." Accordingly, the mobile terminal device 100 can enhance user-friendliness.

Third Embodiment

A mobile terminal device according to a third embodiment of the present invention will be described below with reference to the accompanying drawings. Hereinafter, differences from the above-mentioned first embodiment will be mainly described.

Specifically, in the above-described first embodiment, when a user has touched the side key 30a (the mode is the "shift mode") and the user has also touched one of the keys 30, an explanation on the first function assigned to the key 30 which the user has touched will be displayed.

On the other hand, in the third embodiment, when the user touches the side key 30a, all of the explanations on the first functions will be displayed even if the user has not touched another key 30. Moreover, when the user has touched the side key 30a (the mode is the "shift mode") and the user has also touched any one of the keys 30, an explanation on the first function assigned to the key 30 which the user has touched will be displayed and focused.

(Key Assignment Information)

Descriptions will be provided below for the key assignment information according to the third embodiment of the present invention with reference to the accompanying drawing. FIG. 11 is a table showing the key assignment information according to the third embodiment of the present invention.

As shown in FIG. 11, the key assignment information is the information for associating the type of the keys 30 with the functions assigned to the respective keys 30, as in the case of the first embodiment. Moreover, the first function executed in a case where the mode is the "shift mode" and the second function executed in a case where the mode is the "normal mode" are assigned to the respective keys 30.

For example, to the "1" key, the function to call a customizing screen for modifying the settings of the mobile terminal device 100 is assigned as the first function, and the function to input the number "1" (a character input function) is assigned as the second function. Similarly, to the "2" key, the function to activate a camera is assigned as the first function and the function to input the number "2" is assigned as the second function.

(Operation Of Mobile Terminal Device)

Figure 12:
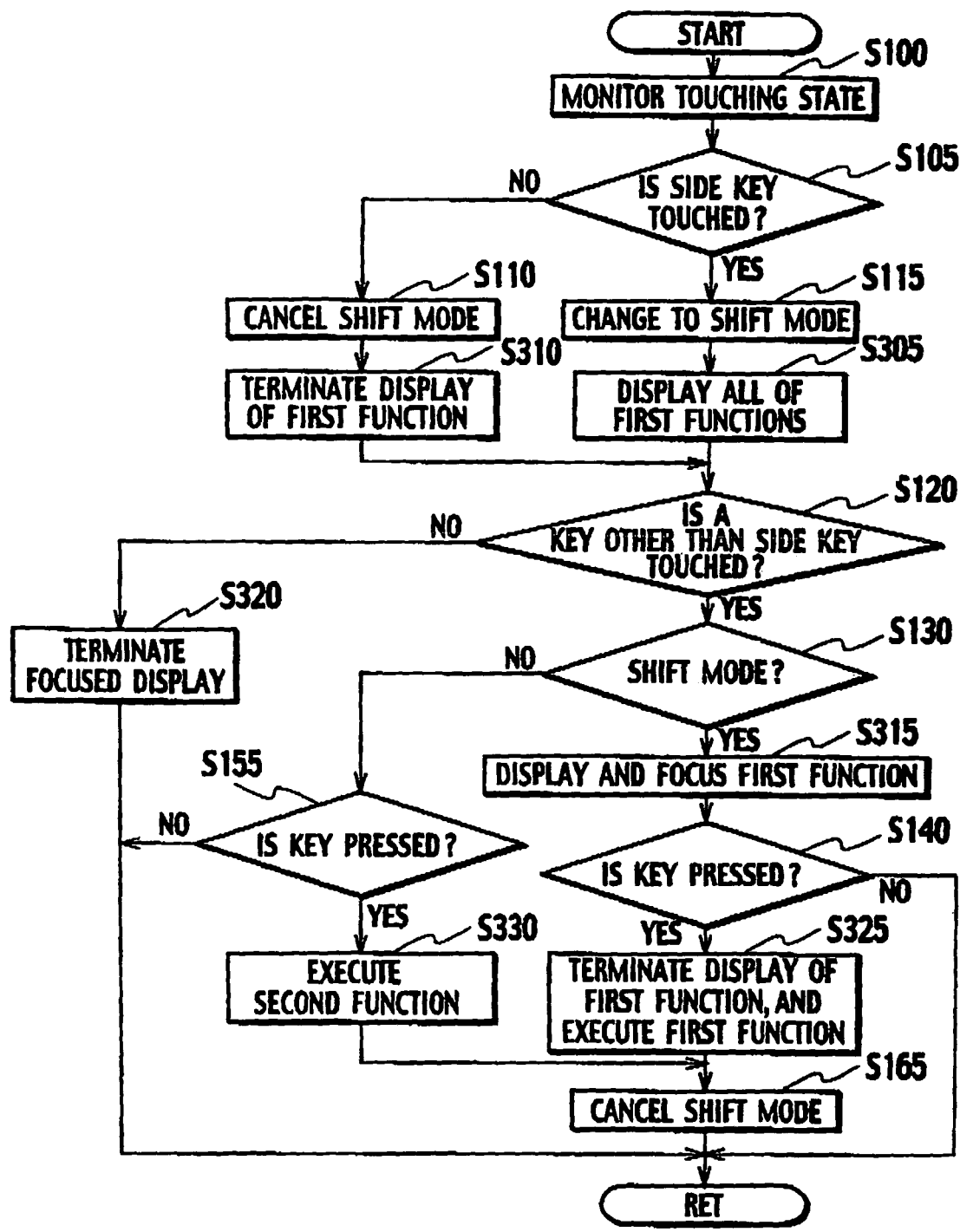
FIG. 12 is a flowchart showing operations of the mobile terminal device 100 according to the third embodiment of the present invention.

Descriptions will be provided for operations of the mobile terminal device 100 according to the third embodiment of the present invention with reference to the accompanying drawings. FIG. 12 is a flowchart showing the operations of the mobile terminal device 100 according to the third embodiment of the present invention. In FIG. 12, the processes identical to those shown in the flowchart of FIG. 5 are designated by the same step numbers.

As shown in FIG. 12, in Step S305, the mobile terminal device 100 displays all of the explanations. On the first functions. Incidentally, the process in Step S305 is a process executed in a case where it is judged in Step S105 that the user has touched the side key 30a.

For example, the mobile terminal device 100 displays on the display unit 20 all of the explanations. On the first functions assigned to each of the "1" to "9" keys in a case where the user has touched the side key 30a.

In Step S310, the mobile terminal device 100 terminates the display of the explanations on the first functions. Incidentally, the process in Step S310 is a process executed in a case where it is judged at Step S105 that the user has touched the side key 30a.

In Step S315, the mobile terminal device 100 displays and focuses the explanation on the first function assigned to the key 30 which the user has touched. Incidentally, the process of Step S315 is a process executed in a case in a case where it is judged in Step S120 that the user has touched the key 30 other than the side key 30a and also in a case where it is judged in Step S130 that the mode is the "shift mode."

For example, in a case where the mode is the "shift mode" and the user touches the "1" key, the mobile terminal device 100 displays and focuses the explanation on the first function assigned to the "1" key, i.e., an explanation on the function to call the customizing screen for modifying the settings of the mobile terminal device 100 (a character string and the like of "customize").

In Step S320, the mobile terminal device 100 terminates the focused display of the explanation on the first function assigned to the key 30 which the user has touched. Incidentally, the process of Step S320 is a process executed in a case where it is judged in Step S120 that the user has touched the key 30 other than the side key 30a.

In Step S325, the mobile terminal device 100 terminates the display of the explanation on the first function and the focused display of the explanation on the first function assigned to the key 30 which the user has pressed. Moreover, the mobile terminal device 100 executes the first function assigned to the key 30 which the user has pressed. Incidentally, the process of Step S325 is a process executed in a case where it is judged in Step S130 that the mode is the "shift mode" and additionally in a case where it is detected in Step S140 that the user has pressed the key 30.

In Step S330, the mobile terminal device 100 executes the second function assigned to the key 30 which the user has pressed. Incidentally, the process of Step S330 is a process executed in a case where it is judged at Step S130 that the mode is not the "shift mode" and additionally in a case where it is detected in Step S155 that the user has pressed the key 30.

(Display Screen)

Figure 13:
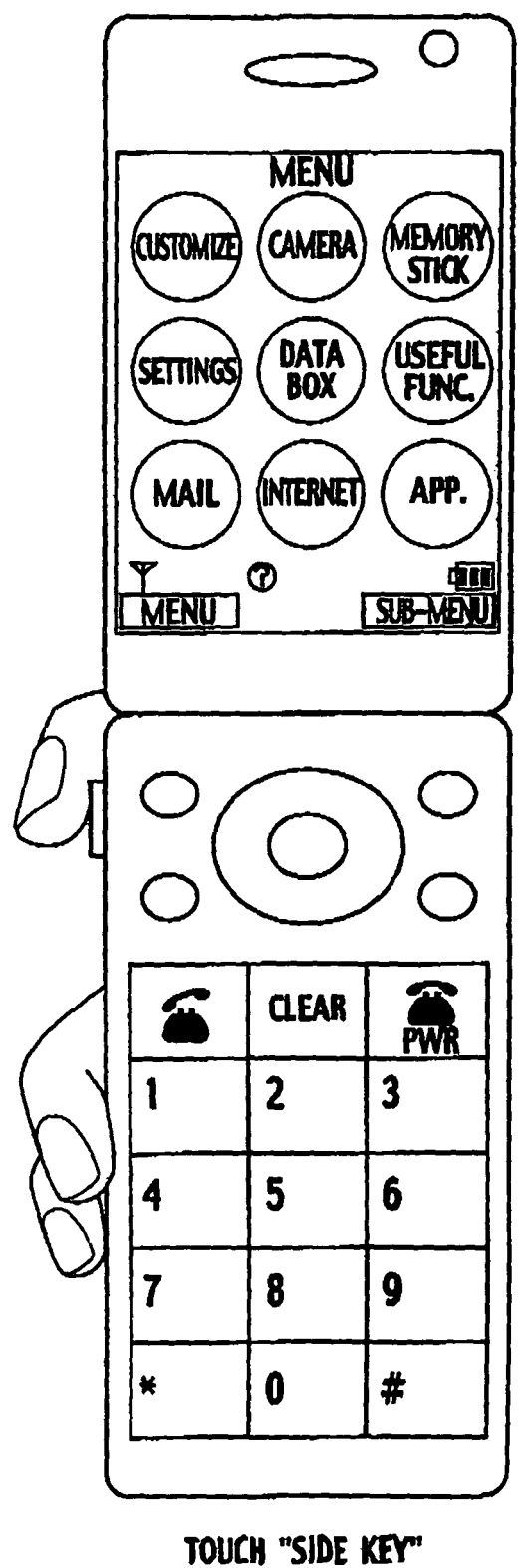
FIG. 13 is a view (part 1) showing a screen to be displayed on a display unit 20 according to the third embodiment of the present invention.
Figure 14:
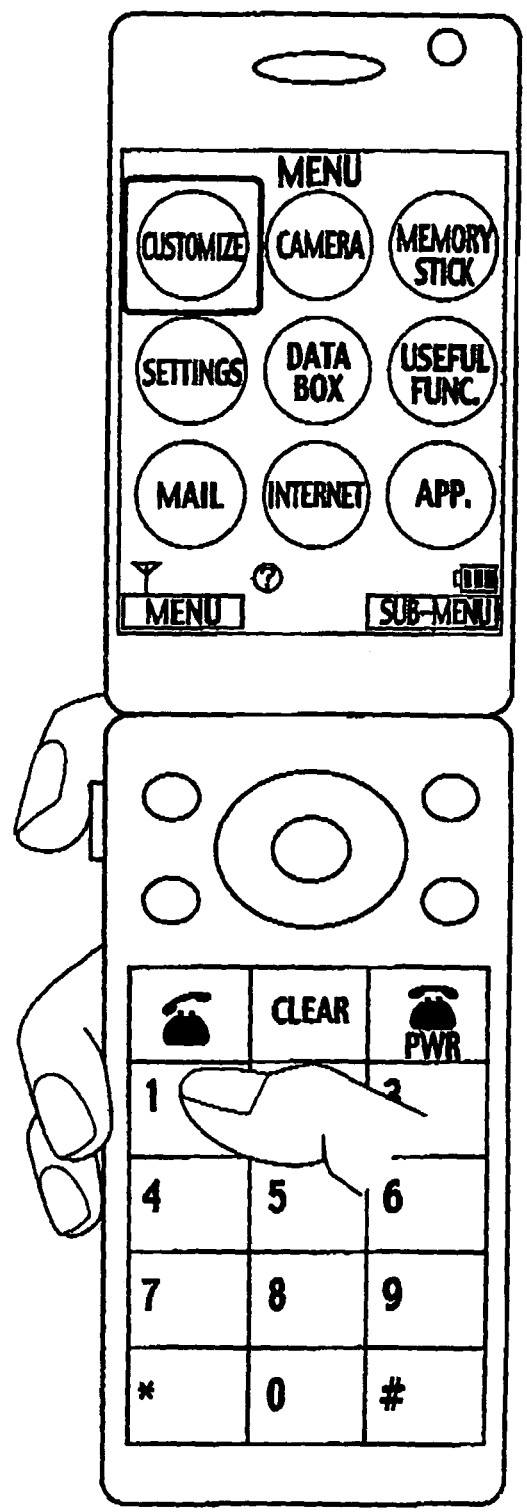
FIG. 14 is a view (part 2) showing a screen to be displayed on a display unit 20 according to the third embodiment of the present invention.

Descriptions will be provided below for a screen to be displayed on the display unit 20 according to the third embodiment of the present invention with reference to the accompanying drawings. FIGS. 13 and 14 are views respectively showing screens to be displayed on the display unit 20 according to the third embodiment of the present invention.

FIG. 13 is a view showing a screen to be displayed on the display unit 20 in a case where a user touches the side key 30a. As shown in FIG. 13, on the display unit 20, all of the explanations on the first function assigned to each key 30 are displayed.

FIG. 14 is a view showing a screen to be displayed on the display unit 20 in a case where the user touches the "1" key in the state shown in FIG. 13. As shown in FIG. 14, on the display unit 20, the explanation on the first function assigned to the "1" key which the user has touched, i.e., the explanation on the function to call the customizing screen for modifying the settings of the mobile terminal device 100 (a character string and the like of "customize") is displayed and focused.

(Action And Effect)

According to the mobile terminal device 100 of the third embodiment, in a case where a user just touches the side key 30a, the mobile terminal device 100 sets the "shift mode" and also displays on the display unit 20 all of the explanations on the first functions, which are to be executed in the "shift mode."

Accordingly, the user can switch the modes easily and can find a desired first function among the first functions easily even without having the knowledge about the first functions which are to be executed in the "shift mode."

Moreover, in a case where the mode is the "shift mode" the mobile terminal device 100 displays and focuses the explanation on the first function assigned to the key 30 which the user has touched. Accordingly, the user can grasp easily the first function which is to be executed in a case where the key 30 is pressed.

Fourth Embodiment

A mobile terminal device according to a fourth embodiment of the present invention will be described below with reference to the accompanying drawings. Hereinafter, differences from the above-mentioned third embodiment will be mainly described.

Specifically, although in the above-described third embodiment, the "shift mode" is set when a user is has touched the side key 30a, in the fourth embodiment the "shift mode" is set when the user has touched the call key 30b.

Moreover, although in the third embodiment described above the "shift mode" is cancelled when the user has not touched the side key 30a, in the fourth embodiment, when the detected state has changed from the touching the call key 30b by the user to touching the key 30 other than the call key 30b sequentially, the "shift mode" will continue without being cancelled until when the user does not touch any one of the keys 30, even if the user has not touched the call key 30b.

(Operation Of Mobile Terminal Device)

Figure 15:
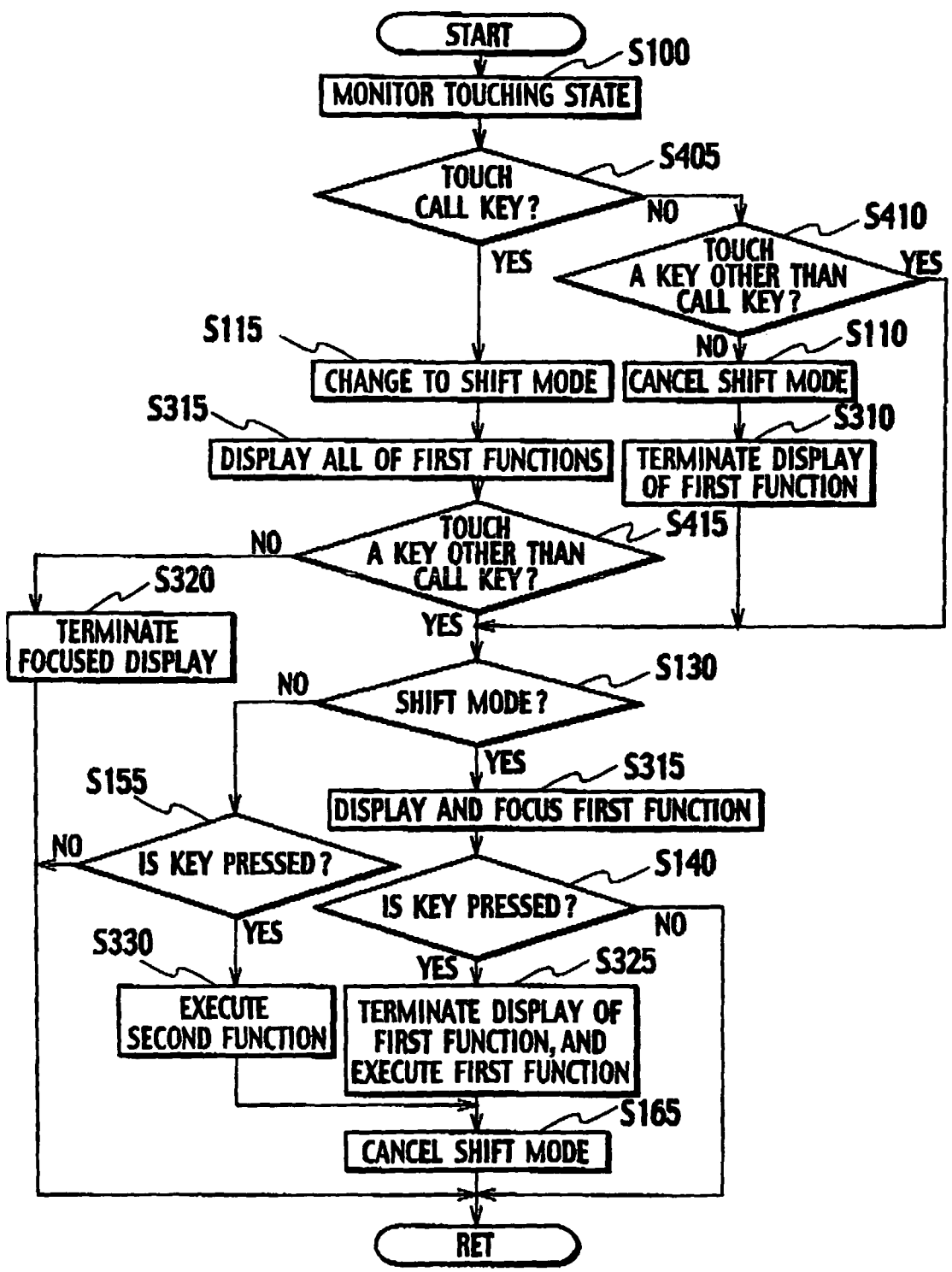
FIG. 15 is a flowchart showing operations of the mobile terminal device 100 according to a fourth embodiment of the present invention.

Descriptions will be provided for operations of the mobile terminal device 100 according to the fourth embodiment of the present invention with reference to the accompanying drawings. FIG. 15 is a flowchart showing the operations of the mobile terminal device 100 according to the third embodiment of the present invention. In FIG. 15, the processes identical to those shown in the flowchart of FIG. 12 are designated by the same step numbers.

As shown in FIG. 15, in Step S405, the mobile terminal device 100 judges whether or not a user has touched the call key 30b. Moreover, the mobile terminal device 100 proceeds to the processing in Step S115 in a case where the user has touched the call key 30b, or proceeds to the processing in Step S410 in a case where the user has not touched the call key 30b.

In Step S410, the mobile terminal device 100 judges whether or not the user has touched any key 30 other than the call key 30b. Moreover, the mobile terminal device 100 proceeds to the processing in Step S130 in a case where the user has touched any key 30 other than the call key 30b, or proceeds to the processing in Step S110 in a case where the user has not touched the key 30 other than the call key 30b.

In Step S415, the mobile terminal device 100 judges whether or not the user has touched the key 30 other than the call key 30b. More over, the mobile terminal device 100 proceeds to the processing in Step S130 in a case where the user has touched the key 30 other than the call key 30b, or proceeds to the process of Step S320 in a case where the user has not touched the keys 30 other than the call key 30b.

Incidentally, even if there is a state (a non-touching state) where a user has not touched any key 30 after the user moves his/her finger off the call key 30b and before the user touches the key 30 other than the call key 30b, the "shift mode" may be continued if the continued time period during which the non-touching state is a short enough (for example, several hundreds of mS).

(Display Screen)

Figure 16:
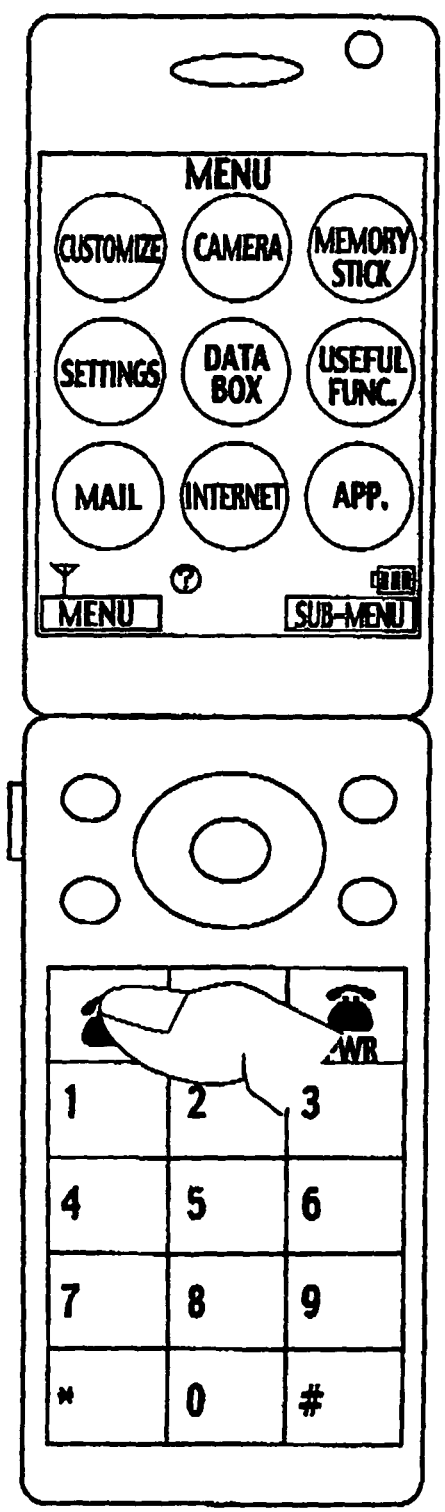
FIG. 16 is a view (part 1) showing a screen to be displayed on a display unit 20 according to the fourth embodiment of the present invention.
Figure 17:
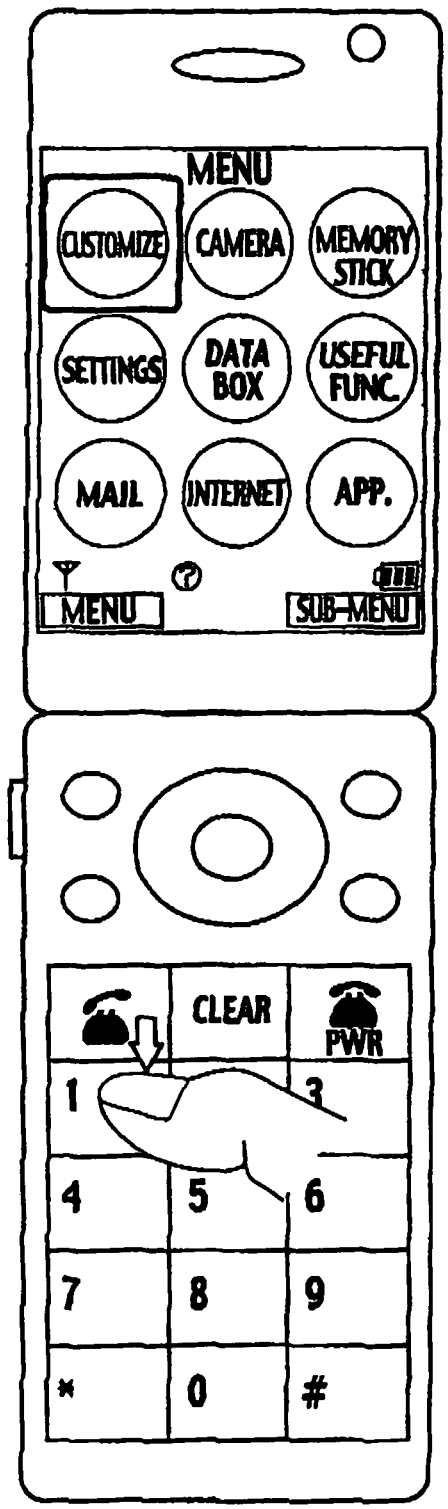
FIG. 17 is a view (part 2) showing a screen to be displayed on a display unit 20 according to the fourth embodiment of the present invention.

Descriptions will be provided below for a screen to be displayed on the display unit 20 according to the fourth embodiment of the present invention with reference to the accompanying drawings. FIGS. 16 and 17 are views respectively showing screens to be displayed on the display unit 20 according to the fourth embodiment of the present invention.

FIG. 16 is a view showing a screen to be displayed on the display unit 20 in a case where a user touches the call key 30b. As shown in FIG. 16, on the display unit 20, all of the explanations on the first functions assigned to the respective keys 30 are displayed.

FIG. 17 is a view showing the screen displayed on the display unit 20 in a case where the user touches the "1" key in the state shown in FIG. 16. As shown in FIG. 17, on the display unit 20, the explanation on the first function assigned to the "1" key which the user has touched, i.e., the explanation on the function to call the customizing screen for modifying the settings of the mobile terminal device 100 (a character string of the "customize" and the like) is displayed and focused.

(Action And Effect)

According to the mobile terminal device 100 of the fourth embodiment, in a case where the detected state has changed from the touching the call key 30b by the user to touching the key 30 other than the call key 30b sequentially, the mobile terminal device 100 keeps the "shift mode" without setting the "normal mode."

Accordingly, in a case where attempting to change the mode to the "shift mode," if a user has touched the key 30 other than the call key 30b sequentially from the state of touching the call key 30b, the touching the call key 30b does not need to be continued, and thus the user-friendliness is enhanced.

That is, since the "shift mode" can continue just by sliding his/her finger to the key 30 other than the call key 30b from the call key 30b, the user-friendliness is enhanced.

Fifth Embodiment

A mobile terminal device according to a fifth embodiment of the present invention will be described below with reference to the accompanying drawings. Hereinafter, differences from the above-mentioned fourth embodiment will be mainly described.

Specifically, although in the above-described third embodiment, the "shift mode" is cancelled when the user has not touched the side key 30a, in the fifth embodiment, when the detected state has changed from touching the side key 30a by the user to touching on the key 30 other than the side key 30a sequentially, the "shift mode" will not be cancelled even if the user has not touched the side key 30a. Moreover, in the fifth embodiment, like in the second embodiment, even in a case where the detected state has been changed from touching the side key 30a by the user to not touching the side key 30a, the "shift mode" will continue for a certain time period without being cancelled.

(Operation Of Mobile Terminal Device).

Figure 18:
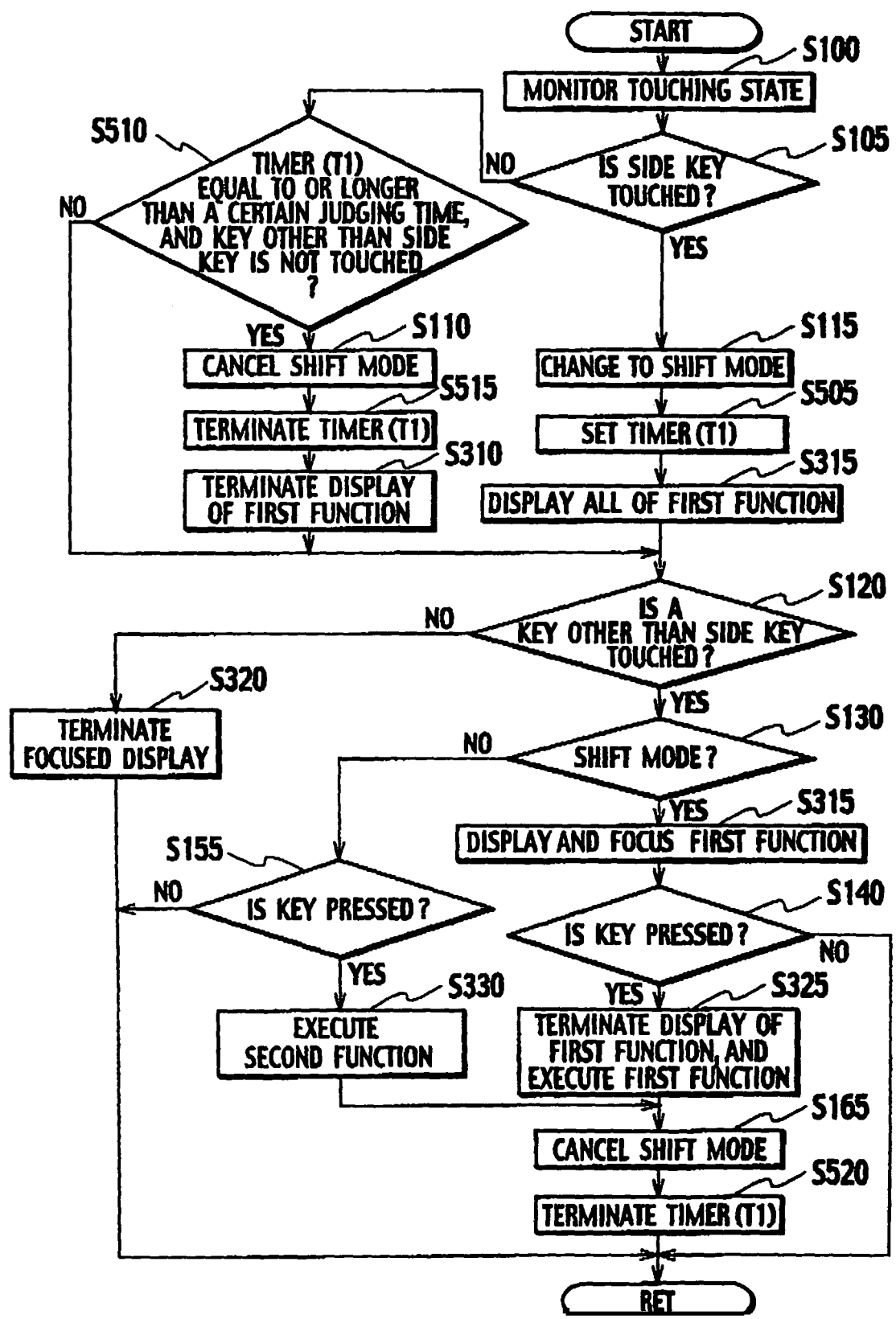
FIG. 18 is a flowchart showing operations of the mobile terminal device 100 according to a fifth embodiment of the present invention.

Descriptions will be provided below for operations of the mobile terminal device 100 according to the fifth embodiment of the present invention with reference to the accompanying drawing. FIG. 18 is a flowchart showing the operations of the mobile terminal device 100 according to the fifth embodiment of the present invention. In FIG. 18, the processes identical to those shown in the flowchart of FIG. 12 are designated by the same step numbers.

As shown in FIG. 18, in Step S505, the mobile terminal device 100 sets the timer (T1) to "0" and starts the count-up of the duration time period of the shift mode. Incidentally, the process in Step S505 is a process executed in a case where it is judged in Step S105 that the user has touched the side key 30a.

In Step S510, the mobile terminal device 100 judges whether or not the duration time period of the shift mode, which is currently counted up by the timer (T1), equals to, or longer than, a certain judging time, and also judges whether or not the user has touched the key 30 other than the side key 30a. Moreover, in a case where the duration time period of the shift mode equals to, or longer than, the certain judging time and also the user has not touched the key 30 other than side the key 30a, the mobile terminal device 100 proceeds to the processing in step S110. On the other hand, the mobile terminal device 100 proceeds to the processing in Step S120 in a case where the duration time period of the shift mode is shorter than the certain judging time or in a case where the user has touched the key 30 other than the side key 30a. Incidentally, the process of Step S510 is a process executed in a case where it is judged in Step S105 that the user has touched the side key 30a.

In Step S515, the mobile terminal device 100 terminates the count-up of the duration time period of the shift mode by the timer (T1). Incidentally, the process of Step S515 is a process executed in a case where it is judged in the processing in Step S510 that the duration time period of the shift mode equals to, or longer than, the certain judging time and also that the user has not touched the key 30 other than the side key 30a.

In Step S520, the mobile terminal device 100 terminates the count-up of the duration time period of the shift mode by the timer (T1). Incidentally, the processing in Step S520 is a process executed in a case where the first function or the second function assigned to the key 30 which the user has pressed is executed.

Incidentally, in the fifth embodiment, the count-up of the duration time period of the shift mode by the timer (T1) started when the user touches the side key 30a, but is not restricted thereto. For example, the count-up of the duration time period of the shift mode by the timer (T1) may start when a user moves his/her finger off the side key 30a. Moreover, in a case where the detected state has changed from touching the side key 30a to touching the key 30 other than the side key 30a sequentially, the count-up of the duration time period of the shift mode by the timer (T1) may start when the touching the relevant key 30 is discontinued.

(Display Screen)

Descriptions will be provided below for transition of screens to be displayed on the display unit 20 according to the fifth embodiment of the present invention with reference to the accompanying drawings. FIG. 19 to FIG. 22 are views respectively showing screens to be displayed on the display unit 20 according to the fifth embodiment of the present invention.

Figure 19:
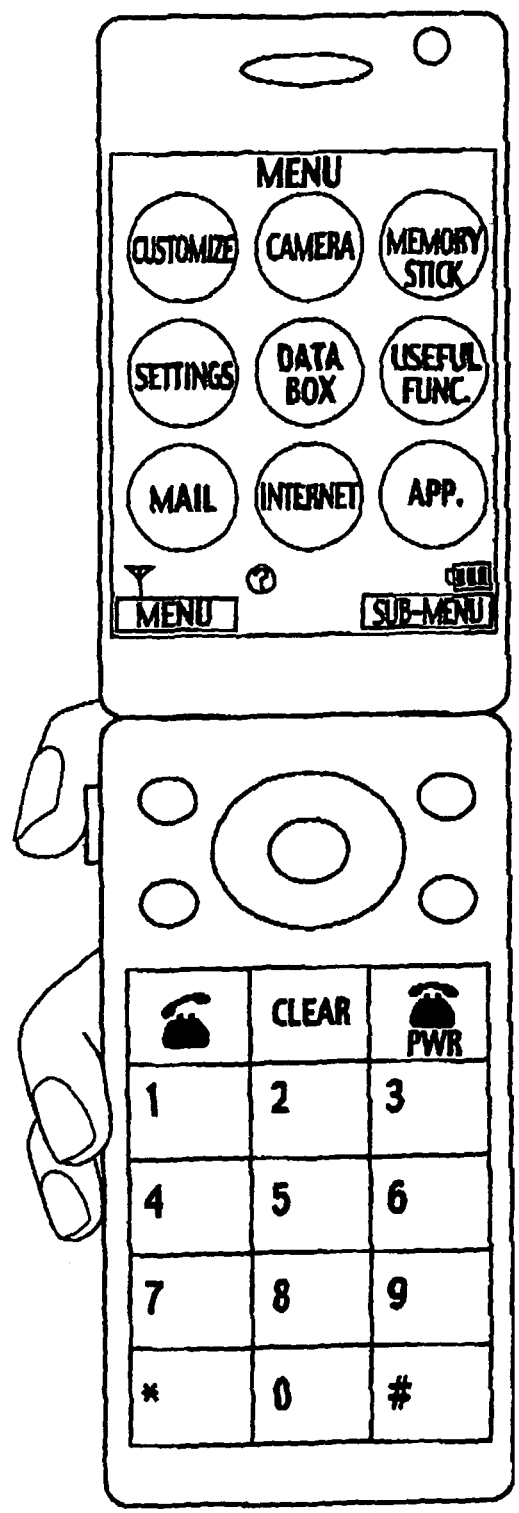
FIG. 19 is a view (part 1) showing a screen to be displayed on a display unit 20 according to the fifth embodiment of the present invention.

FIG. 19 is a view showing a screen to be displayed on the display unit 20 in a case where a user touches the side key 30a. As shown in FIG. 19, all of the explanations on the first functions assigned to the respective keys 30 are displayed on the display unit 20.

Figure 20:
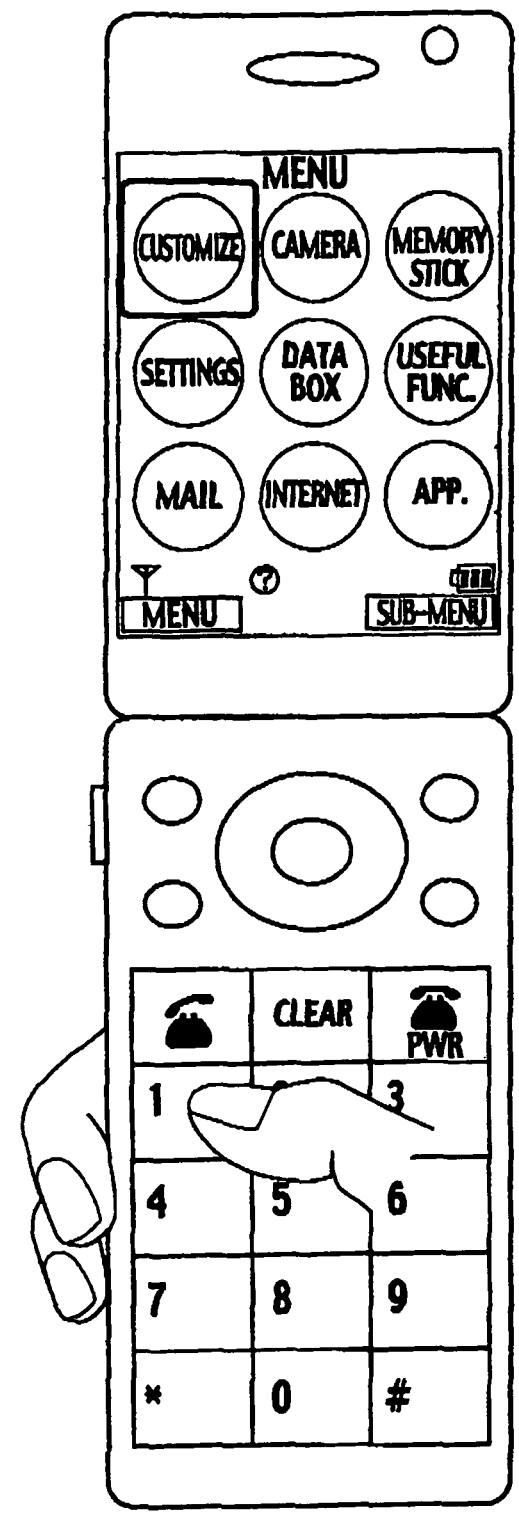
FIG. 20 is a view (part 2) showing a screen to be displayed on a display unit 20 according to the fifth embodiment of the present invention.

FIG. 20 is a view showing a screen to be displayed on the display unit 20 in a case where the user touches the "1" key sequentially from the state shown in FIG. 19. As shown in FIG. 20, on the display unit 20, the explanation on the first function assigned to the "1" key which the user has touched, i.e., the explanation on the function to call the customizing screen for modifying the settings of the mobile terminal device 100 (a character string of "customize" and the like) its displayed and focused.

Figure 21:
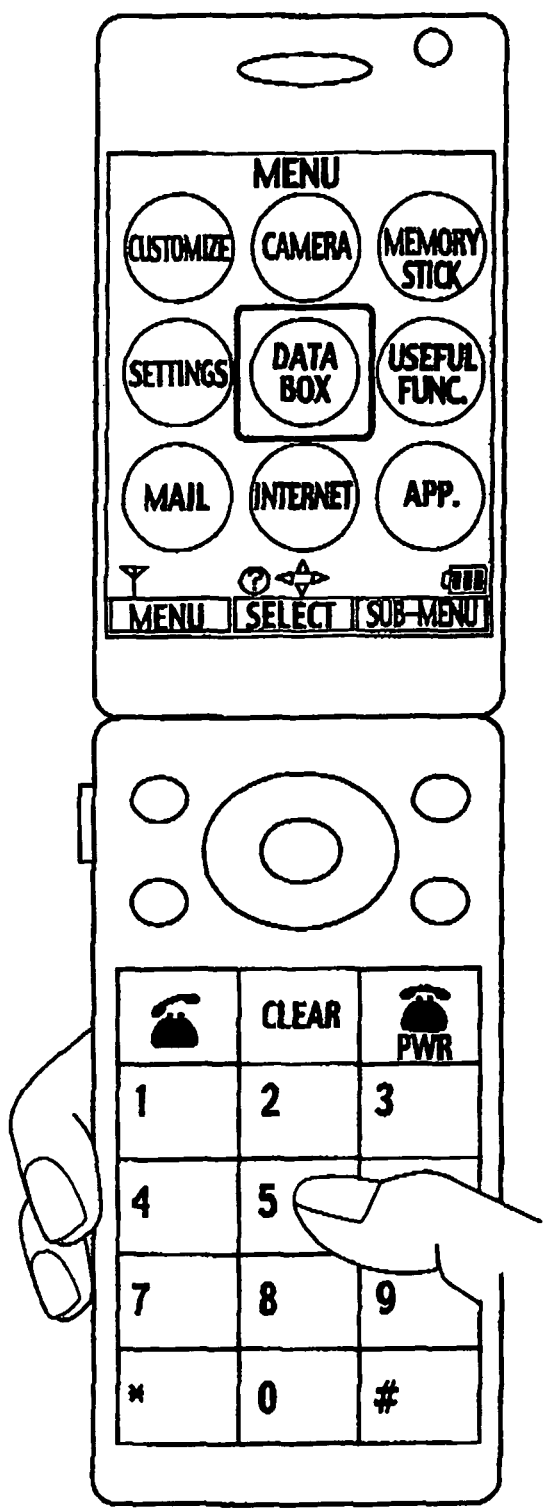
FIG. 21 is a view (part 3) showing a screen to be displayed on a display unit 20 according to the fifth embodiment of the present invention.

FIG. 21 is a view showing a screen to be displayed on the display unit 20 in a case where the user touches the "5" key while touching any one of the keys 30 in the state shown in FIG. 20. As shown in FIG. 21, on the display unit 20, the explanation on the first function assigned to the "5" key which the user has touched, i.e., the explanation on the function to call the screen for editing the Data box (a character string of "Data box" and the like) is displayed and focused.

Figure 22:
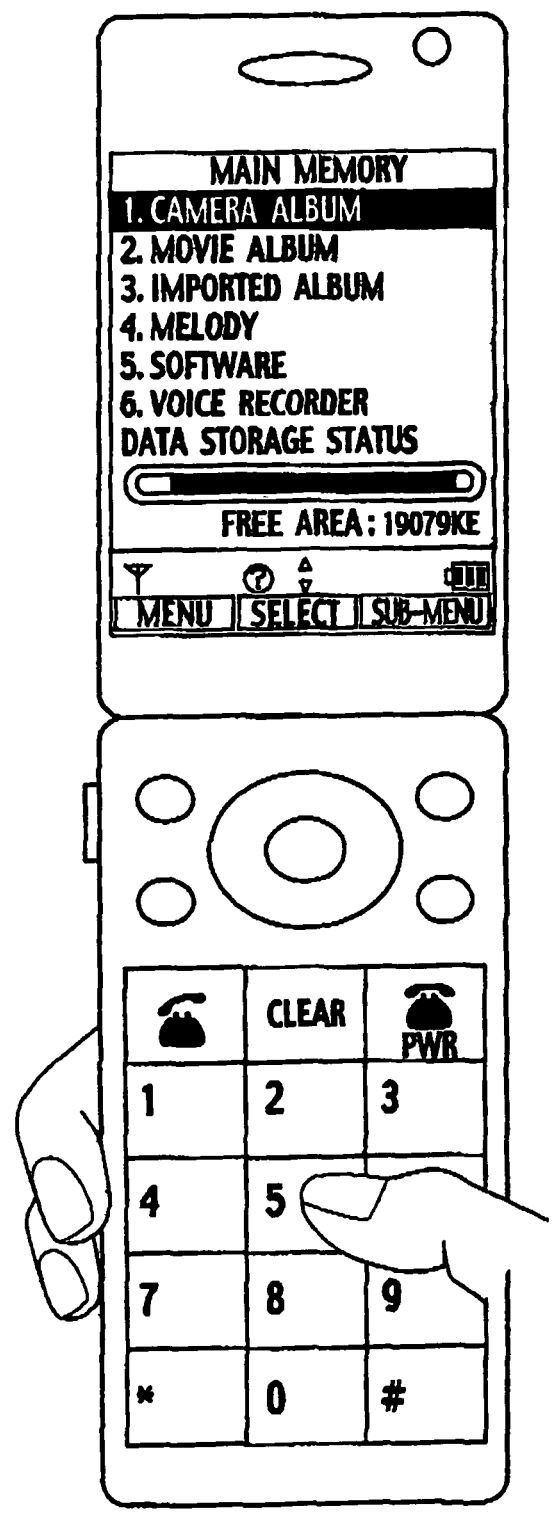
FIG. 22 is a view (part 4) showing a screen to be displayed on a display unit 20 according to the fifth embodiment of the present invention.

FIG. 22 is a view showing a screen to be displayed on the display unit 20 in a case where the user presses the "5" key in the state shown in FIG. 21. As shown in FIG. 22, the first function assigned to the "5" key which the user has pressed, i.e., the function to call the screen for editing the Data box is executed, and the screen for editing the Data box is displayed on the display unit 20.

(Action And Effect)

According to the mobile terminal device 100 of the fifth embodiment, in a case where the detected state has changed from touching the side key 30a by the user to touching the key 30 other than the side key 30a sequentially, the mobile terminal device 100 keeps the "shift mode" and does not set the "normal mode."

Accordingly, if the user, in a case where attempting to cause the mobile terminal device 100 to execute the function of the "shift mode", has touched any one of the keys 30 other than the side key 30a sequentially from the state of touching the side key 30a, the user needs not to continue touching the side key 30a. Thus, the user-friendliness is enhanced.

That is, since the "shift mode" can continue just by sliding the user's finger to the key 30 other than the side key 30a from the side key 30a, the user-friendliness is enhanced.

Moreover, in a case where the detected state has been changed from touching the side key 30a by the user to not touching the side key 30a, the "shift mode" continues for a certain time period.

Hence, even if the user moves his/her finger off the side key 30a unintentionally, for example the user re-grasps the mobile terminal device 100, the mobile terminal device 100 keeps the "shift mode." Accordingly, the mobile terminal device 100 can enhance user-friendliness.

Modification Example

In the above-described first to fifth embodiments, the user is notified of the explanations on the functions by way, of the display on the display unit 20. However, the present invention is not limited to this configuration. The user may be notified of the explanations aurally or tactually. For example, the user may be notified of the explanations on the functions by means of audio, Braille, and the like.

Moreover, it is also possible to provide a program for causing a computer to execute the operations of the mobile terminal device 100 according to any of the first to fifth embodiments.

Furthermore, in the first to fifth embodiments, the touch pad 10b is configured to only detect touching the key 30 by the user. However, the present invention is not limited to this configuration. The touch pad 10b may be also configured to detect touching the key 30 and pressing the key 30 by the user.

In the first to fifth embodiments, the operations of the mobile terminal device 100 are designed as loop processing. However, the present invention is not limited to this configuration. The operations may be designed as interrupt processing in which detection by the touch pad 10b is used as a trigger. Alternatively, the operations may be designed as polling processing to be executed at an appropriate time interval so as to monitor user operations sufficiently.

In addition, a time period for pressing the key 30 by the user (hereinafter referred to as pressing time) is not remarked in particular in the first to fifth embodiments. However, it is also possible to switch the functions to be executed depending on the pressing time for the key 30.

Specifically, even if the mode is the "normal mode," the first function may be executed in a case where the pressing time period of the key 30 exceeds a certain time period. Similarly, even if the mode is the "shift mode," the second function may executed in a case where the pressing time period of the key 30 is shorter than the certain time period.

What is claimed is:

1. A mobile terminal device provided with a plurality of keys and a certain key located at a side surface which is different from a surface where the plurality of keys are located in a phone chassis, the mobile terminal device comprising:
    a touch detector configured to detect touching any of the keys and the certain key by a user;
    a press detector configured to detect pressing any of the keys and the certain key by the user;
    a mode switcher configured to switch a mode of a group of the keys to a first mode in which at least a first function selected from a group comprising calling a mail editing screen and calling a screen for using the Internet is available in a case where the user touches the certain key, which is not one of the group of the keys, and to switch the mode of the group of the keys to a second mode in which at least a second function selected from a group comprising calling a menu screen and calling a jump screen is available in a case where the user does not touch the certain key;
    a function executor configured to execute the first function assigned to an input key, which is a key different from the certain key and is one of the group of the keys, in a case where the press detector detects in the first mode that the user has pressed the input key among the plurality of keys, and to execute the second function assigned to the input key in a case where the press detector detects in the second mode that the user has pressed the input key; and
    an output unit including a display screen configured to display a plurality of explanations of the first function assigned to each key of the group of the keys in a case where the touch detector detects that the user has touched the certain key and the explanation of the first function assigned to a specific one of the keys is not associated with the specific one of the keys on the display screen until the specific one of the keys is pressed,
    wherein the output unit outputs an explanation of the second function assigned to the input key in a case where the touch detector detects in the second mode that the user has touched the input key, and
    wherein even if a detected status has been changed from touching the certain key by the user to not touching the certain key, the mode switcher keeps the first mode until a timer reaches a predetermined time without switching the mode from the first mode to the second mode.

2. The mobile terminal device according to claim 1, wherein the explanation of the first function assigned to the group of the keys is displayed on display screen and is not displayed on the group of the keys.

3. The mobile terminal device according to claim 1, wherein the output unit highlights an explanation of the first function assigned to the input key in a case where the touch detector detects in the first mode that the user has touched the input key, the explanation being one of the plurality of explanations of the first function assigned to each key of the group of the keys.

4. A mobile terminal device provided with a plurality of keys and a certain key located at a side surface which is different from a surface where the plurality of keys are located in a phone chassis, the mobile terminal device comprising:
    a touch detector configured to detect touching any of the keys and the certain key by a user;
    a press detector configured to detect pressing any of the keys and the certain key by the user;
    a mode switcher configured to switch a mode of a group of the keys to a first mode in which at least a first function selected from a group comprising calling a mail editing screen and calling a screen for using the Internet is available in a case where the user touches the certain key, which is not one of the group of the keys, and to switch the mode of the group of the keys to a second mode in which at least a second function selected from a group comprising calling a menu screen and calling a jump screen is available in a case where the user does not touch the certain key;
    a function executor configured to execute the first function assigned to an input key, which is a key different from the certain key and is one of the group of the keys, in a case where the press detector detects in the first mode that the user has pressed the input key among the plurality of keys, and to execute the second function assigned to the input key in a case where the press detector detects in the second mode that the user has pressed the input key; and
    an output unit including a display screen configured to display a plurality of explanations of the first function assigned to each key of the group of the keys in a case where the touch detector detects that the user has touched the certain key and the explanation of the first function assigned to a specific one of the keys is not associated with the specific one of the keys on the display screen until the specific one of the keys is pressed,
    wherein the output unit outputs an explanation of the second function assigned to the input key in a case where the touch detector detects in the second mode that the user has touched the input key, and wherein in a case where a detected status has been changed from touching the certain key by the user to touching the input key by the user sequentially, the mode switcher keeps the first mode without switching the mode from the first mode to the second mode until when the user does not touch any one of the input keys, even if the user has not touched the certain key.

5. A processing method in a mobile terminal device provided with a plurality of keys and a certain key located at a side surface which is different from a surface where the plurality of keys are located in a phone chassis, the processing method comprising:

detecting, via the mobile terminal device, touching any of the keys and the certain key by a user;

detecting, via the mobile terminal device, pressing any of the keys and the certain key by the user;

switching, via the mobile terminal device, a mode of a group of the keys to a first mode in which at least a first function selected from a group comprising calling a mail editing screen and calling a screen for using the Internet is available in a case where the user touches the certain key, which is not one of the group of the keys, and switching the mode of the group of the keys to a second mode in which at least a second function selected from a group comprising calling a menu screen and calling a jump screen is available in a case where the user does not touch the certain key;

executing, via the mobile terminal device, the first function assigned to an input key, which is a key different from the certain key and is one of the group of the keys, in a case where it is detected in the first mode that the user has pressed the input key among the plurality of keys, and executing the second function assigned to the input key in a case where it is detected in the second mode that the user has pressed the input key;

outputting, via a display screen of the mobile terminal device, a plurality of explanations of the first function assigned to each key of the group of the keys in a case where it is detected that the user has touched the certain key, and the explanation of the first function assigned to a specific one of the keys is not associated with the specific one of the keys on the display until the specific one of the keys is pressed; and outputting, via the mobile terminal device, an explanation of the second function assigned to the input key in a case where it is detected in the second mode that the user has touched the input key, wherein even if a detected status has been changed from touching the certain key by the user to not touching the certain key, the first mode is kept until a timer reaches a predetermined time without switching the mode from the first mode to the second mode.

6. The processing method according to claim 5, wherein the explanation of the first function assigned to the group of the keys is displayed on the display screen and is not displayed on the group of the keys.

7. The processing method according to claim 5, wherein the output unit highlights an explanation of the first function assigned to the input key in a case where it is detected in the first mode that the user has touched the input key, the explanation being one of the plurality of explanations of the first function assigned to each key of the group of the keys.

8. A processing method in a mobile terminal device provided with a plurality of keys and a certain key located at a side surface which is different from a surface where the plurality of keys are located in a phone chassis, the processing method comprising:

detecting, via the mobile terminal device, touching any of the keys and the certain key by a user;

detecting, via the mobile terminal device, pressing any of the keys and the certain key by the user;

switching, via the mobile terminal device, a mode of a group of the keys to a first mode in which at least a first function selected from a group comprising calling a mail editing screen and calling a screen for using the Internet is available in a case where the user touches the certain key, which is not one of the group of the keys, and switching the mode of the group of the keys to a second mode in which at least a second function selected from a group comprising calling a menu screen and calling a jump screen is available in a case where the user does not touch the certain key;

executing, via the mobile terminal device, the first function assigned to an input key, which is a key different from the certain key and is one of the group of the keys, in a case where it is detected in the first mode that the user has pressed the input key among the plurality of keys, and executing the second function assigned to the input key in a case where it is detected in the second mode that the user has pressed the input key;

outputting, via a display screen of the mobile terminal device, a plurality of explanations of the first function assigned to each key of the group of the keys in a case where it is detected that the user has touched the certain key, and the explanation of the first function assigned to a specific one of the keys is not associated with the specific one of the keys on the display until the specific one of the keys is pressed; and outputting, via the mobile terminal device, an explanation of the second function assigned to the input key in a case where it is detected in the second mode that the user has touched the input key, wherein in a case where a detected status has been changed from touching the certain key by the user to touching the input key by the user sequentially, the first mode is kept without switching the mode from the first mode to the second mode until when the user does not touch any one of the input keys, even if the user has not touched the certain key.

9. A mobile terminal device provided with a plurality of keys and a certain key located at a side surface which is different from a surface where the plurality of keys are located in a phone chassis, the mobile terminal device comprising:

a touch detector configured to detect touching any of the keys and the certain key by a user;

a press detector configured to detect pressing any of the keys and the certain key by the user;

a mode switcher configured to switch a mode of a group of the keys to a first mode in which at least a first function selected from a group comprising calling a mail editing screen and calling a screen for using the Internet is available in a case where the user touches the certain key, which is not one of the group of the keys, and to switch the mode of the group of the keys to a second mode in which at least a second function selected from a group comprising calling a menu screen and calling a jump screen is available in a case where the user does not touch the certain key;

a function executor configured to execute the first function assigned to an input key, which is a key different from the certain key and is one of the group of the keys, in a case where the press detector detects in the first mode that the user has pressed the input key among the plurality of keys, and to execute the second function assigned to the input key in a case where the press detector detects in the second mode that the user has pressed the input key; and an output unit including a display screen configured to display a plurality of explanations of the first function assigned to each key of the group of the keys in a case where the touch detector detects that the user has touched the certain key and the explanation of the first function assigned to a specific one of the keys is not associated with the specific one of the keys on the display screen until the specific one of the keys is pressed, wherein the output unit outputs an explanation of the second function assigned to the input key in a case where the touch detector detects in the second mode that the user has touched the input key, and wherein, after the user has touched the certain key, the output unit terminates the display of the plurality of explanations of the first function assigned to each key of the group of the keys in a case where a predetermined time has passed and the user has not touched one of the group of keys.

10. A processing method in a mobile terminal device provided with a plurality of keys and a certain key located at a side surface which is different from a surface where the plurality of keys are located in a phone chassis, the processing method comprising:

detecting, via the mobile terminal device, touching any of the keys and the certain key by a user;

detecting, via the mobile terminal device, pressing any of the keys and the certain key by the user;

switching, via the mobile terminal device, a mode of a group of the keys to a first mode in which at least a first function selected from a group comprising calling a mail editing screen and calling a screen for using the Internet is available in a case where the user touches the certain key, which is not one of the group of the keys, and switching the mode of the group of the keys to a second mode in which at least a second function selected from a group comprising calling a menu screen and calling a jump screen is available in a case where the user does not touch the certain key;

executing, via the mobile terminal device, the first function assigned to an input key, which is a key different from the certain key and is one of the group of the keys, in a case where it is detected in the first mode that the user has pressed the input key among the plurality of keys, and executing the second function assigned to the input key in a case where it is detected in the second mode that the user has pressed the input key;

outputting, via a display screen of the mobile terminal device, a plurality of explanations of the first function assigned to each key of the group of the keys in a case where it is detected that the user has touched the certain key, and the explanation of the first function assigned to a specific one of the keys is not associated with the specific one of the keys on the display until the specific one of the keys is pressed; and outputting, via the mobile terminal device, an explanation of the second function assigned to the input key in a case where it is detected in the second mode that the user has touched the input key, wherein, after the user has touched the certain key, the outputting the plurality of explanations of the first function includes terminating the display of the plurality of explanations of the first function assigned to each key of the group of the keys in a case where a predetermined time has passed and the user has not touched one of the group of keys.

* * * * *